US012801214B2

(12) United States Patent
Beavers

(10) Patent No.: US 12,801,214 B2
(45) **Date of Patent: *Nov. 17, 2026**

(54) SYSTEMS, METHODS, AND TECHNIQUES FOR SAFELY CONTROLLING DEVICES USING EYE GAZE CONTROL

(71) Applicant: Jay Curtis Beavers, Duvall, WA (US)

(72) Inventor: Jay Curtis Beavers, Duvall, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,397

(22) Filed: Dec. 12, 2024

(65) Prior Publication Data

US 2026/0244264 A1 Aug. 20, 2026

Related U.S. Application Data

(63) Continuation of application No. 18/133,177, filed on Apr. 11, 2023, now Pat. No. 12,204,687.

(51) Int. Cl.
*G06F 3/01* (2006.01)
*G05B 19/042* (2006.01)

(52) U.S. Cl.
CPC ......... *G06F 3/013* (2013.01); *G05B 19/0423* (2013.01); *G05B 2219/2608* (2013.01); *G05B 2219/2637* (2013.01)

(58) Field of Classification Search
CPC ................ G06F 3/013; G05B 19/0423; G05B 2219/2608; G05B 2219/2637
See application file for complete search history.

(56) References Cited

U.S. PATENT DOCUMENTS 4,323,829 A 4/1982 Witney et al.
4,767,940 A 8/1988 Tuttle
(Continued)

FOREIGN PATENT DOCUMENTS

CN 105892691 8/2016
CN 106547453 3/2017
(Continued)

OTHER PUBLICATIONS

International Search Report and Written Opinion issued by the International Searching Authority in International Application No. PCT/US2021/054053 on Jan. 13, 2022.
(Continued)

*Primary Examiner* — Lisa S Landis
(74) *Attorney, Agent, or Firm* — Lowe Graham Jones PLLC; Ellen M. Bierman

(57) ABSTRACT

Methods, systems, and techniques for controlling actuators by using eye gaze technology such as in a wheelchair or bed, are provided. Example embodiments provide an Eye Gaze Actuator Control System ("EGACS") which enables people with advanced motor neuron diseases or disabilities like amyotrophic lateral sclerosis or muscular dystrophy to use eye gaze technologies to control their actuators that control seating, bed positioning, and movement of motor-controlled devices. In one embodiment, the example EGACS comprises a display device, eye gaze sensor, eye gaze control application, and device interface(s) to one or more other devices that control aspects of a powered wheelchair, bed, vehicle, or other device. These components cooperate to control the powered wheelchair, bed, or vehicle using eye gaze technology as opposed to by manual control.

33 Claims, 17 Drawing Sheets

(56) References Cited

U.S. PATENT DOCUMENTS

| | | | | |
|---|---|---|---|---|
| 5,345,281 | A | 9/1994 | Taboado et al. | |
| 6,424,338 | B1 | 7/2002 | Anderson | |
| 8,862,307 | B2 | 10/2014 | Pettersson et al. | |
| 9,557,812 | B2 | 1/2017 | Maltz | |
| 2008/0097256 | A1 | 4/2008 | Torres et al. | |
| 2008/0132383 | A1 | 6/2008 | Einav et al. | |
| 2010/0212087 | A1* | 8/2010 | Leib | A61G 12/00 5/81.1 R |
| 2012/0046821 | A1 | 2/2012 | Pettersson et al. | |
| 2013/0271358 | A1 | 10/2013 | Yuen | |
| 2016/0101664 | A1 | 4/2016 | Richter | |
| 2016/0267708 | A1 | 9/2016 | Nistico | |
| 2018/0014988 | A1 | 1/2018 | Diaz-Flores et al. | |
| 2018/0135987 | A1 | 5/2018 | Evans | |
| 2018/0214091 | A1 | 8/2018 | Baker et al. | |
| 2018/0369037 | A1 | 12/2018 | Desaulniers et al. | |
| 2019/0213382 | A1 | 7/2019 | Zhang et al. | |
| 2020/0022577 | A1* | 1/2020 | Rishoni | A61B 3/113 |
| 2020/0111260 | A1 | 4/2020 | Osborn et al. | |
| 2020/0324152 | A1 | 10/2020 | Goldfish et al. | |
| 2021/0141444 | A1 | 5/2021 | Speelman et al. | |
| 2021/0240259 | A1 | 8/2021 | Bull | |
| 2022/0104959 | A1 | 4/2022 | Beavers | |

FOREIGN PATENT DOCUMENTS

| | | |
|---|---|---|
| CN | 106074021 | 2/2018 |
| CN | 109662842 | 4/2019 |
| ES | 2326571 | 10/2009 |
| JP | 2018-529171 | 10/2018 |
| KR | 10-0488684 B1 | 5/2005 |
| WO | 2001026599 | 4/2001 |
| WO | 2007120099 | 10/2007 |
| WO | 2018090109 | 5/2018 |

OTHER PUBLICATIONS

Extended European Search Report issued by the European Patent Office in European Patent Application No. 21878570.7 on Sep. 30, 2024.

Aarai, Kohei, et al., "A prototype of electric wheelchair controlled by eye-only for paralyzed user.," Journal of Robotics and Mechatronics, vol. 23, No. 1, Feb. 2011, pp. 66-74.

"Actions per minute," Wikipedia, the Free Encyclopedia, May 29, 2022, https://en.wikipedia.org/wiki/Actions per minute, accessed Jun. 19, 2023, 2 pages.

Araujo, Jacopo M., et al., "Exploring Eye-Gaze Wheelchair Control," ETRA '20 Adjunct: ACM Symposium on Eye Tracking Research and Applications, Article No. 16, Jun. 2020, 8 pages.

Aydin Atasoy, Nesrin, et al., "Real-time motorized electrical hospital bed control with eye-gaze tracking," ELECTRIK, vol. 24, Jan. 1, 2016, pp. 5162-5172.

Barea, et al., "EOG Technique to Guide a Wheelchair," 7 pages.

Barea, et al., "System for Assisted Mobility Using Eye Movements Based on Electrooculography," IEEE Transactions on Neural Systems and Rehabilitation Engineering, vol. 10, No. 4, Dec. 2002, pp. 209-218.

Bartolein, C., et al., "Multilevel Intention Estimation for Wheelchair Control," Proceedings of the European Control Conference 2007, Jul. 2-5, 2007, pp. 5463-5470.

Bastide, Rémi, et al., "A model-based approach for real-time embedded multimodal systems in military aircrafts," ICMI '04: Proceedings of the 6th international conference on Multimodal interfaces, ACM Digital Library, Oct. 2004, pp. 243-250.

Bates, R., et al., "Introducing Cogain—Communication by Gaze Interaction," 8 pages.

Bernhaupt, Regina, et al., "Usability Study of Multi-modal Interfaces Using Eye-Tracking," Human-Computer Interaction—INTERACT 2007, LNISA, vol. 4663, Part II, IFIP International Federation for Information Processing, 2007, pp. 412-424.

Bhuyain, Fahim, et al., "Design and Development of an EOG-based System to Control Electric Wheelchair for People Suffering from Quadriplegia or Quadriparesis," 2019 International Conference on Robotics,Electrical and Signal Processing Techniques (ICREST), IEEE, Jan. 10-12, 2019, pp. 460-465.

Bien, Z., et al., "Development of a Wheelchair-based Rehabilitation Robotic System (KARES II) with Various Human-Robot Interaction Interfaces for the Disabled," Proceedings of the 2003 IEEE/ASME, International Conference on Advanced Intelligent Mechatronics (AIM 2003), pp. 902-907.

Bishop, Ronald and Matthew Rutyna, "Eye Tracking Innovation for Aviation Research," Journal of New Business Ideas & Trend, vol. 19, Issue 3, Dec. 2021, 5 pages.

"Blind Spot Sensors for Wheelchairs," Braze Mobility, 2020, https://brazemobility.com/blind-spot-sensor-systems/, accessed Jun. 20, 2023, 3 pages.

Chee, F. P., et al., "Eye Tracking Electronic Wheelchair for Physically Challenged Pers," ARPN Journal of Engineering and Applied Sciences, vol. 12, No. 13, Asian Research Publishing Network, Jul. 2017, pp. 4078-4083.

Cojocaru, Dorian, et al., "Using an eye gaze new combined approach to control a wheelchair movement," 23rd International Conference on System Theory, Control and Computing, IEEE, Oct. 2019, pp. 626-631.

"Corpus® Seating System," Permobil, 2023, https://www.permobil.com/en-us/products/power-wheelchairs/functions/corpus-seating-system, accessed Jun. 20, 2023, 6 pages.

Doshi, Anup, et al., "A Novel Active Heads-Up Display for Driver Assistance," IEEE Transactions on Systems, Man, and Cybernetics, Part B (Cybernetics), vol. 29, Issue 1, IEEE, Feb. 2009, pp. 85-93.

Eid, Mohamad A., et al., "A Novel Eye-Gaze-Controlled Wheelchair System for Navigating Unknown Environments: Case Study With a Person With ALS," IEEE Access, vol. 4, Jan. 28, 2016, pp. 558-573.

Elliot, Michael A, et al., "Eye-controlled, power wheelchair performs well for ALS patients," Clinicle Research Article, Muscle & Nerve, Feb. 23, 2019, pp. 513-519.

"Emotive Insight Headseat," Emotive, 2023, https://www.emotiv.com/insight/, accessed Jun. 20, 2023, 18 pages.

"Eye Tracking," Wikipedia, the Free Encyclopedia, May 8, 2023, https://en.wikipedia.org/wiki/Eye_tracking#Technologies_and_techniques, accessed Jun. 19, 2023, 20 pages.

"Eye tracking on HoloLens 2," Microsoft, Mar. 2, 2023, https://docs.microsoft.com/en-us/windows/mixed-reality/design/eye-tracking, accessed Jun. 19, 2023, 8 pages.

Fehr, L., et al., "Adequacy of Power Wheelchair Control Interfaces for Persons with Severe Disabilities: A Clinical Survey," Journal of Rehabilitation Research and Development, Department of Veterans Affairs, vol. 37, No. 3, May/Jun. 2000, pp. 353-360.

Felzer, T., et al., "HaWCoS: The 'Hands-Free' Wheelchair Control System," pp. 127-134.

Gêgo, Daniel, et al., "Teleoperation of a mobile robot based on eye-gaze tracking," 12th Iberian Conference on Information Systems and Technologies, IEEE, Jun. 2017, 6 pages.

"How do Tobii eye trackers work?", Knowledge Article, Tobii Connect, Mar. 29, 2023, https://connect.tobii.com/s/article/How-do-Tobii-eye-trackers-work, accessed Jun. 19, 2023, 2 pages.

"Invacare G-Series hospital bed," Invacare, http://www.invacare.com/cgi-bin/imhqprd/inv_catalog/prod_cat_detail.jsp?prodID=G5510, accessed Jun. 28, 2023, 1 page.

Kar, A., "A Review and Analysis of Eye-Gaze Estimation Systems, Algorithms and Performance Evaluation Methods in Consumer Platforms," Accepted for Publication in IEEE Access. DOI 10.1109/Access 2017, 25 pages.

Khan, Muhammad Qasim and Sukhan Lee, "Gaze and Eye Tracking: Techniques and Applications in ADAS," Sensors 2019, 24, 5540, Dec. 14, 2019, 36 pages.

Ktena, Sofia Ira, et al., "A virtual reality platform for safe evaluation and training of natural gaze-based wheelchair driving," 7th Annual International IEEE EMBS Conference on Neural Engineering, IEEE, Apr. 22-24, 2015, pp. 236-239.

Künzler, Simon, "Human intent-recognition system for safety-critical human-machine interactions," Master's thesis in Complex

(56) References Cited

OTHER PUBLICATIONS

Adaptive Systems, Department of Mechanics and Maritime Sciences, CHALMERS University of Technology, 2020, 60 pages.
Law, C., et al., "A Cap as Interface for Wheelchair Control," Proceedings of the 2002 IEEE/RSJ International Conference on Intelligent Robots and Systems EPFL, Lausanne, Switzerland, Oct. 2002, pp. 1439-1444.
Lee, D., et al., "Biological Surface Electromyographic Switch and Necklace-Type Button Switch Control as an Augmentative and Alternative Communication Input Device: a Feasibility Study," Australasian Physical & Engineering Science in Medicine, vol. 42, 2019, pp. 839-851.
Lin, C., et al., "Powered Wheelchair Controlled by Eye-Tracking System," Optical Applicata, vol. 36, No. 2-3, 2006, pp. 401-412.
Martinez-Marquez, et al., "Application of Eye Tracking Technology in Aviation, Maritime, and Construction Industries: A Systematic Review," Sensors 2021, 21, 4289, Jun. 23, 2021, 40 pages.
Matsumoto, Yoshio, et al., "Development of Intelligent Wheelchair System with Face and Gaze Based Interface," IEEE International Workshop on Robot and Human interactive Communication, IEEE, Sep. 18-21, 2001, pp. 262-267.
Mazo, M., et al., "An Integral System for Assisted Mobility," IEEE Robotics & Automation Magazine, Mar. 2001, pp. 46-56.
Merchant, S., et al., "Applying eye tracking as an alternative approach for activation of controls and functions in aircraft," 9th DASC. 19th Digital Avionics Systems Conference. Proceedings, Cat. No. 00CH37126, IEEE, Oct. 2000, 9 pages.
Miller, D., et al., "A Robotic Wheelchair," American Institute of Aeronautics and Astronautics, Inc., 1993, pp. 407-411.
Moon, Richard, "A Suggestion-based Advanced Driving Assistance System for Semi-autonomous Vehicles in Safety Critical Situations," University of Colorado Boulder, 2020, 86 pages.
"NeuroNode," Control Bionics, 2012-2023, https://www.controlbionics.com/products/, accessed Jun. 20, 2023, 7 pages.
Nicolas-Alonso, L., et al., "Brain Computer Interfaces, a Review," Sensors, 2012, vol. 12, pp. 1211-1279.
"Permobil M3 Corpus," Permobil, 2023, https://www.permobil.com/en-us/products/power-wheelchairs/permobil-m3-corpus, accessed Jun. 20, 2023, 8 pages.
Rupanagudi, Sudhir Rao, et al., "A Video Processing Based Eye Gaze Recognition Algorithm for Wheelchair Control," 10th International Conference on Dependable Systems, Services and Technologies, IEEE, Jun. 2019, pp. 241-247.
Shinde, Shalini, et al., "A Review: Eye Tracking Interface with Embedded System & IOT," 2018 International Conference on Computing, Power and Communication Technologies, IEEE, Sep. 2018, pp. 791-795.
"Smart Wheelchair system," Luci, 2020, https://luci.com/, accessed Jun. 20, 2023, 10 pages.
"Standard Power Module—120A," Curtiss-Wright, https://www.cw-industrialgroup.com/Products/Mobility-Vehicle-Solutions/R-net/Standard-Power-Module, accessed Jun. 28, 2023, 1 page.
Stellmach, Sophie, et al., "Designing Gaze-based User Interfaces for Steering in Virtual Environments," User Interface & Software Engineering Group, University of Magdeburg, Association for Computing Machinery, Inc, Mar. 28-30, 2012, pp. 131-138.
Sunny, Md Samiul Haque, et al., "Eye-gaze control of a wheelchair mounted 6DOF assistive robot for activities of daily living," Journal of NeuroEngineering and Rehabilitation 18, Article No. 173, Dec. 18, 2021, 12 pages.
Tall, Martin, et al., "Gaze-controlled driving," CHI 2009, Apr. 4-9, 2009, 6 pages.
"Tobii Pro Glasses 3," Tobii, 2022, https://www.tobiipro.com/product-listing/tobii-pro- glasses-3/, accessed Jun. 20, 2023, 24 pages.
Traoré, Michael, et al., "Exploratory study with eye tracking devices to build interactive systems for air traffic controllers," HCI-Aero '16: Proceedings of the International Conference on Human-Computer Interaction in Aerospace, Article No. 6, Sep. 14, 2016, 9 pages.
"Twindrive® TD1 220/250 User Manual," Homeline, 24 pages.
Wang, Chao, et al., "A Collision Avoidance Strategy for Safe Autonomous Navigation of an Intelligent Electric-Powered Wheelchair in Dynamic Uncertain Environments with Moving Obstacles," 2013 European Control Conference (ECC), Jul. 17-19, 2013, pp. 4382-4387.
Wastlund, E., et al., "What You See is Where You Go: Testing a Gaze-Driven Power Wheel-chair for Individuals with Severe Multiple Disabilities," ETRA 2010, Austin, Texas, Mar. 22-24, 2010, pp. 133-136.
Wastlund, E., et al., "Evaluating Gaze-Driven Power Wheelchair with Navigation Support for Persons with Disabilities," Jul. 9, 2021, 17 pages.
Watson, Ginger S., et al., "Simulation-Based Environment for the Eye-Tracking Control of Tele-Operated Mobile Robots," SpringSim—MSCIAAS, Society for Modeling & Simulation International, Apr. 3-6, 2016, 7 pages.
Wu, Min, et al., "Gaze-based Intention Anticipation over Driving Manoeuvres in Semi-Autonomous Vehicles," 2019 IEEE/RSJ International Conference on Intelligent Robots and Systems, IEEE, Nov. 2019, pp. 6210-6216.
Zhang, Guangtao, et al., "Eye-Gaze-Controlled Telepresence Robots for People with Motor Disabilities," 2019 14th ACM/IEEE International Conference on Human-Robot Interaction, IEEE, Mar. 2019, p. 574-575.
Zhang, Guangtao, et al., "Hand- and gaze-control of telepresence robots," ETRA '19: Proceedings of the 11th ACM Symposium on Eye Tracking Research & Applications, Article No. 70, Jun. 2019, 8 pages.
Zhang, Guangtao, et al., "Accessible Control of Telepresence Robots based on Eye Tracking, " ERTA '19, Jun. 25-28, 2019, 3 pages.
Zhang, Guangtao, et al., "People with Motor Disabilities Using Gaze to Control Telerobots," CHI EA '20: Extended Abstracts of the 2020 CHI Conference on Human Factors in Computing Systems, Apr. 2020, 9 pages.
International Search Report and Written Opinion issued by the International Searching Authority in Internation Application No. PCT/US2024/049573 on Dec. 5, 2024.
International Search Report and Written Opinion issued by the International Searching Authority in International Application No. PCT/2024/017988 on Jun. 5, 2024.
HomeBrace, "Sicher fahren mit der MyEcc, Tutorial Rollstuhlumbau," YouTube, uploaded by HomeBrace—Your Home at your hands, Feb. 7, 2018, https://www.youtube.com/watch?v=bQsr-3l_v0o.
HomeBrace, "Operating Manual MyEcc Control," HomeBraceGermany UG (haftungsbeschränkt), Feb. 2022, https://web.archive.org/web/20240109043706/https://homebrace.com/en/pdf/MyEcc_Manual.pdf, 15 pages.
Homebrace, "MyEcc and MyArm," Oct. 21, 2021, https://web.archive.org/web/20211021042832/https://homebrace.com/en/myecc.php, 8 pages.
Office Action issued by the Israeli Patent Office in Israeli Patent Application No. 301665 on Sep. 7, 2025.

* cited by examiner

SYSTEMS, METHODS, AND TECHNIQUES FOR SAFELY CONTROLLING DEVICES USING EYE GAZE CONTROL

CROSS-REFERENCE TO RELATED APPLICATIONS

This application claims priority to U.S. patent application Ser. No. 18/133,177, titled "SYSTEMS, METHODS, AND TECHNIQUES FOR SAFELY CONTROLLING DEVICES USING EYE GAZE CONTROL," filed Apr. 11, 2023; which application is incorporated herein by reference in its entirety.

TECHNICAL FIELD

The present disclosure relates to methods, techniques, and systems for safely controlling devices using eye gaze control technology and to methods, techniques, and systems for safely actuating a powered wheelchair, powered bed, vehicles, or other devices using eye gaze control.

BACKGROUND

Powered chairs and beds are commonly used to provide comfort and pressure relief for people who are mobility disabled, permanently or temporarily. There are many situations where these devices are motorized to enable positional control and ambulatory movement (propulsion). These devices are generally controlled using hands.

Currently, these powered propulsion systems use a joystick and button control system movable using fingers, typically with up three or four axes of control and two directions of movement on each axis. In some situations, people with certain disabilities, such as people with advanced motor neuron diseases or disabilities like amyotrophic lateral sclerosis, muscular dystrophy, or spinal cord injury, cannot use their hands to control joystick and button-based control systems, leaving them at the mercy of their caregivers to understand their physical needs and desired ambulation—movement of the wheelchair or other device—on their behalf.

DETAILED DESCRIPTION

Figure 1:
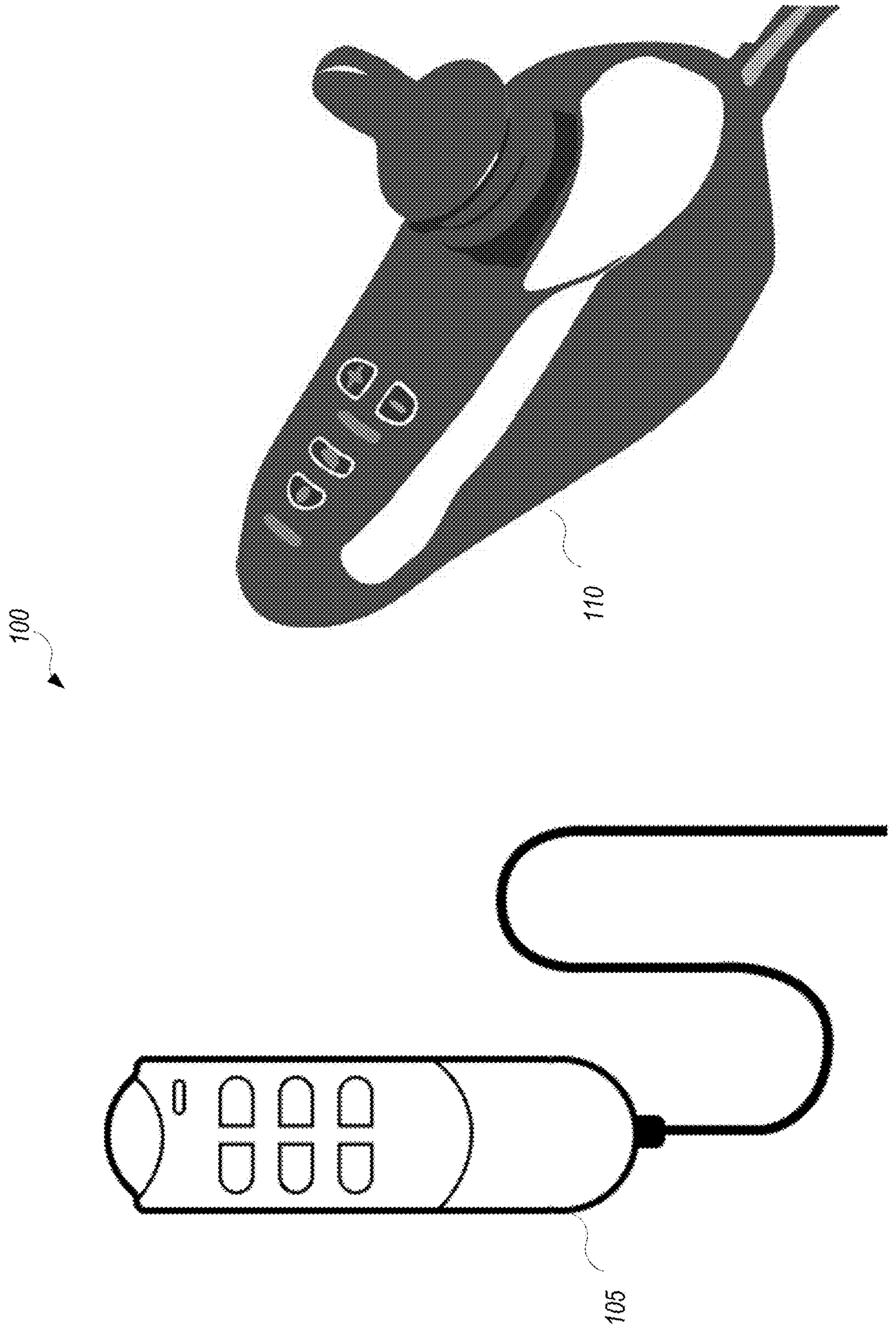
FIG. 1 is an example of a traditional control system showing a three-axis remote control and a joystick with buttons, both actuated via fingers.

Embodiments described herein provide enhanced systems, methods, and techniques for a person to control actuators, for example to provide ambulation by means of a wheelchair, by using their eyes to gaze on virtual buttons on a display to facilitate movement, such as associated with a powered wheelchair or bed. Example embodiments provide an Eye Gaze Actuator Control System ("EGACS") which enables people with advanced motor neuron diseases or disabilities like amyotrophic lateral sclerosis or muscular dystrophy to use eye gaze technologies previously primarily used to generate speech to control their aspects of the wheelchair, bed, or other device. The problem with using speech to control actuators that control propulsion of the wheelchair is that spelling out commands is slow and not well suited to stopping and starting movement of a device that may be encountering dangerous situations with quick course correction needed. The improved techniques of an EGACS seek to restore independence to people with disabilities that do not otherwise enable them to reliably use traditional button-based or joystick like control systems by a more efficient and natural mechanism that is more immediately responsive.

A system that uses eye gaze control to control positioning of the seat of the wheelchair or bed is described in detail in U.S. patent application Ser. No. 17/495,776, titled "SYSTEMS, METHODS, AND TECHNIQUES FOR EYE GAZE CONTROL OF SEAT AND BED POSITIONING," filed Oct. 6, 2021, which is incorporated herein by reference in its entirety. That application describes a powered wheelchair equipped with a tablet computer mounted in front of the wheelchair occupant and connected to the control system of the powered wheelchair. The tablet computer has a camera on it which views the person's eyes (an "eye gaze camera") and then uses well known algorithms (e.g., executing on a microcontroller) to determine where the person is looking on the screen. In some cases, the eye gaze camera is a discrete device and in other cases the eye gaze camera is integrated into the chassis of the display. The eye gaze camera sensor can be as simple as an RGB digital camera or it can be a combination of one or more specialty components designed to enhance the precision and computation of eye gaze location, such as by using IR filtered cameras, IR light emitters, and dedicated coprocessors. Examples of eye gaze algorithms for use with such devices include those described in "https://connect.tobii.com/s/article/How-do-Tobii-eye-trackers-work" and in "https://en.wikipedia.org/wiki/Eye_tracking#Technologies_and_techniques" which are incorporated herein by reference in their entireties. In brief, the tablet is executing a software/firmware application which presents user interface controls/elements such as virtual buttons which actuate (e.g., are selected/clicked) when the person looks at the button continuously for a period of time. As the person continues to look at the button, it becomes 'pressed' to allow the person to select the duration of control and therefore the amount of position change.

The system described in U.S. application Ser. No. 17/495,776 describes an Eye Gaze Positioning Control System that may also be used to control a powered positioning bed, such as a hospital bed or powered reclining chair. Typically, a hospital bed is equipped with a tablet computer mounted on a nearby wall or ceiling and connected to a control system of the hospital bed positioning system. Similar to the tablet computer used with a powered wheelchair, the tablet computer used with a powered positioning bed has an associated camera which views the person's eyes and an application which presents virtual buttons which are eye gaze actuated.

The Eye Gaze Actuator Control System ("EGACS") described herein includes improved technology and methods that allow the eye gaze interface described above (including for example, a camera sensor, display, and eye gaze algorithms) to be extended and improved to control all types of actuators including those that are single dimensional, such as those that control seat positioning, and rotational actuators that control axle rotation to ultimately control the wheels and hence movement of the device. The EGACS uses a combination of visual targets (e.g., user interface elements) in an attention area, an eye gaze camera which measures a location in the attention area where the person is looking, and a set of intentional gaze determination ("IGD") algorithms that removes involuntary, distracted, or ephemeral data from the inputted information. This allows the EGACS to use a somewhat unreliable control method, the focal axis of eyes, to be translated into deterministic and safe intentions to act.

In overview, the EGACS filters out unintentional actions, such as involuntary blinks, distraction saccades due to object movement in the background, and quick glances and retains user intention. It provides a safety mechanism by cancelling all action when the eye vector is removed from the attention area or the eyes are shut indicating a desire to terminate actuation.

Accordingly, an example EGACS provides a user interface that may be used to control movement of a powered wheelchair, motorized bed, or other motorized vehicle without relying on sophisticated object recognition algorithms to identify objects, obstructions, and paths in the external environment. Instead, the EGACS allows a human occupant to control or "drive" the movement of the chair/bed/vehicle. This provides a potentially safer alternative to strict dependence on totally automated self-propulsion systems (such as autonomous vehicles). In addition, the EGACS may be supplemented with artificial intelligence algorithms and other object recognition techniques to provide further improvements to the intentional gaze determination ("IGD") algorithms.

In addition, various alternatives and enhancements may be incorporated in an example EGACS including use of a head mounted display or using a room display and camera or some combination of both. For example, a head mounted display such as augmented reality glasses may be used to display control buttons and detect eye gaze position. Example AR glasses for use with EGACS embodiments include, for example, Microsoft HoloLens ("https://docs.microsoft.com/en-us/windows/mixed-reality/design/eye-tracking") or Tobii Pro Glasses 3 ("https://www.tobiipro.com/product-listing/tobii-pro-glasses-3/"). In such scenarios, the display and cameras are attached to the glasses. Algorithms and microcontrollers may or may not be contained in the glasses themselves. For example, Microsoft HoloLens collate the display, cameras, and processing all on the head mounted device. As another example, Tobii Pro Glasses provide an implementation where just the eye gaze cameras are located on the head mounted device, and the display and computation are separately mounted. As well, a room display and camera, such as a wall or ceiling mounted display or surface, may be used to present actuation buttons and detect eye gaze position. For example, the television screen in a hospital room can be eye gaze enabled to allow control of the hospital bed position or movement. In another example, an ICU (intensive care unit) room may include an eye gaze enabled display mounted above the bed to allow for posture control. In another example, user interface controls may be projected on a wall or ceiling and an eye gaze camera used to detect and recognize eye gaze position and cause activation of the wheelchair/bed/chair actuators.

FIG. 1 is an example of a traditional control system showing a three-axis remote control and a joystick with buttons, both actuated via fingers. FIG. 1 shows two current control systems for powered beds and powered wheelchairs that are actuated via fingers. The three-axis remote control 105 has three pair of buttons, each button increases or decreases the position of one axis of movement allowing a person to change his/her posture one step at time. Holding down a button typically results in a continuous change in position in the direction indicated. Traditional powered seating wheelchairs, hospital beds, and powered reclining chairs come with some variation of this type of controller. Controller 105 is a three-axis controller that supports changing posture such as recline, leg lift, and tilt. Control device 110 includes a combination of a joystick and a set of buttons used to control the wheel movement and speed of a powered wheelchair. Traditional powered wheelchairs come with some variation of this type of controller.

Figure 2:
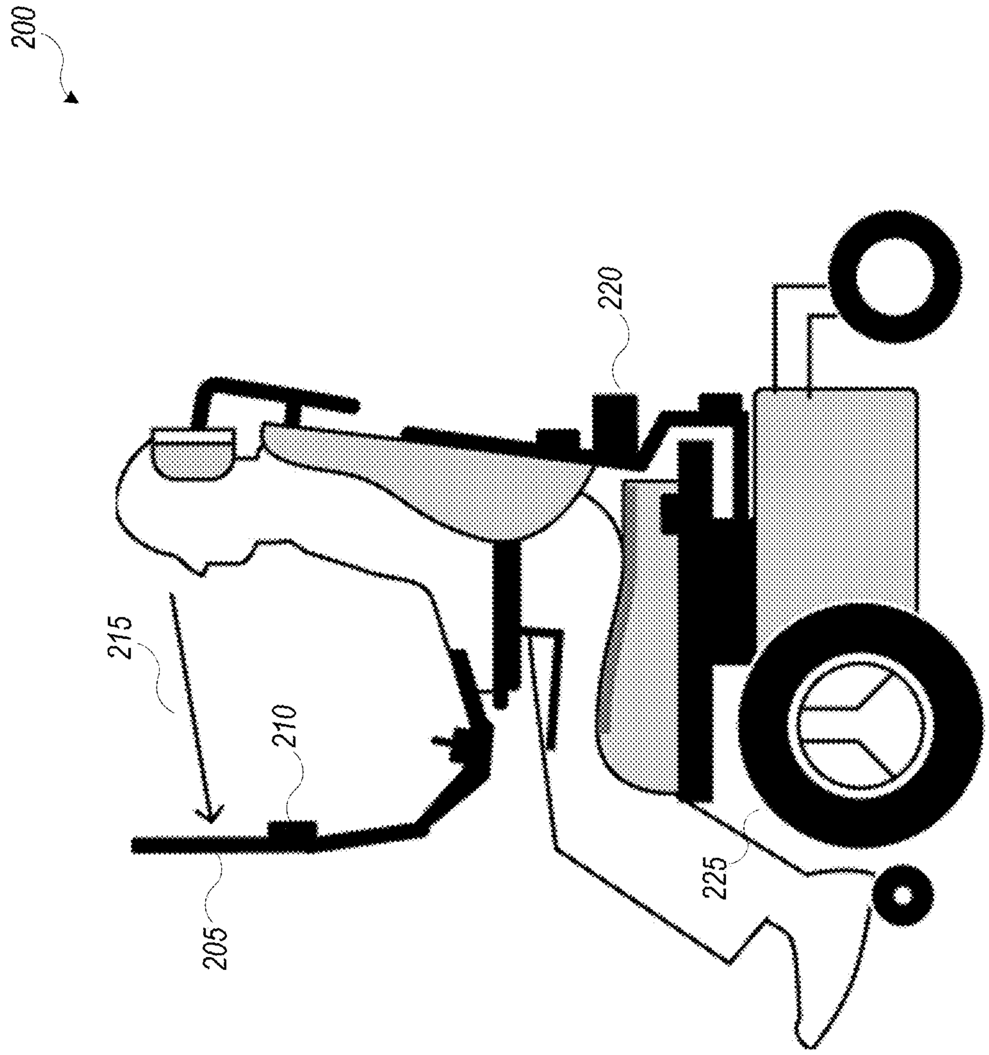
FIG. 2 is an example block diagram of an example powered wheelchair with powered propulsion used with an example Eye Gaze Actuator Control System.

FIG. 2 is an example block diagram of an example powered wheelchair with powered propulsion used with an example Eye Gaze Actuator Control System. The EGACS has a display 205 which shows a user interface which provides visual targets (e.g., user interface controls, buttons, or elements) which can be activated (e.g., clicked or selected) through detection of a gaze vector 215 via eye gaze sensors 210 and projecting the vector onto an X/Y coordinate intersection of the display surface 205. The X/Y intersection of the gaze vector 215 is used to infer user intent which is then translated into commands sent to one or more actuator controllers 220. The actuator controllers 220 then provide power and direction to seating axis actuators (not shown) or wheel axis actuators 225 embedded in the powered chair chassis which result in a change in posture or wheelchair chassis movement. Additional inputs, actuators, and sensors can be attached to the EGACS, some examples of which include push button switches, cameras, and camera point/tilt/pan systems, and the like.

Figure 3:
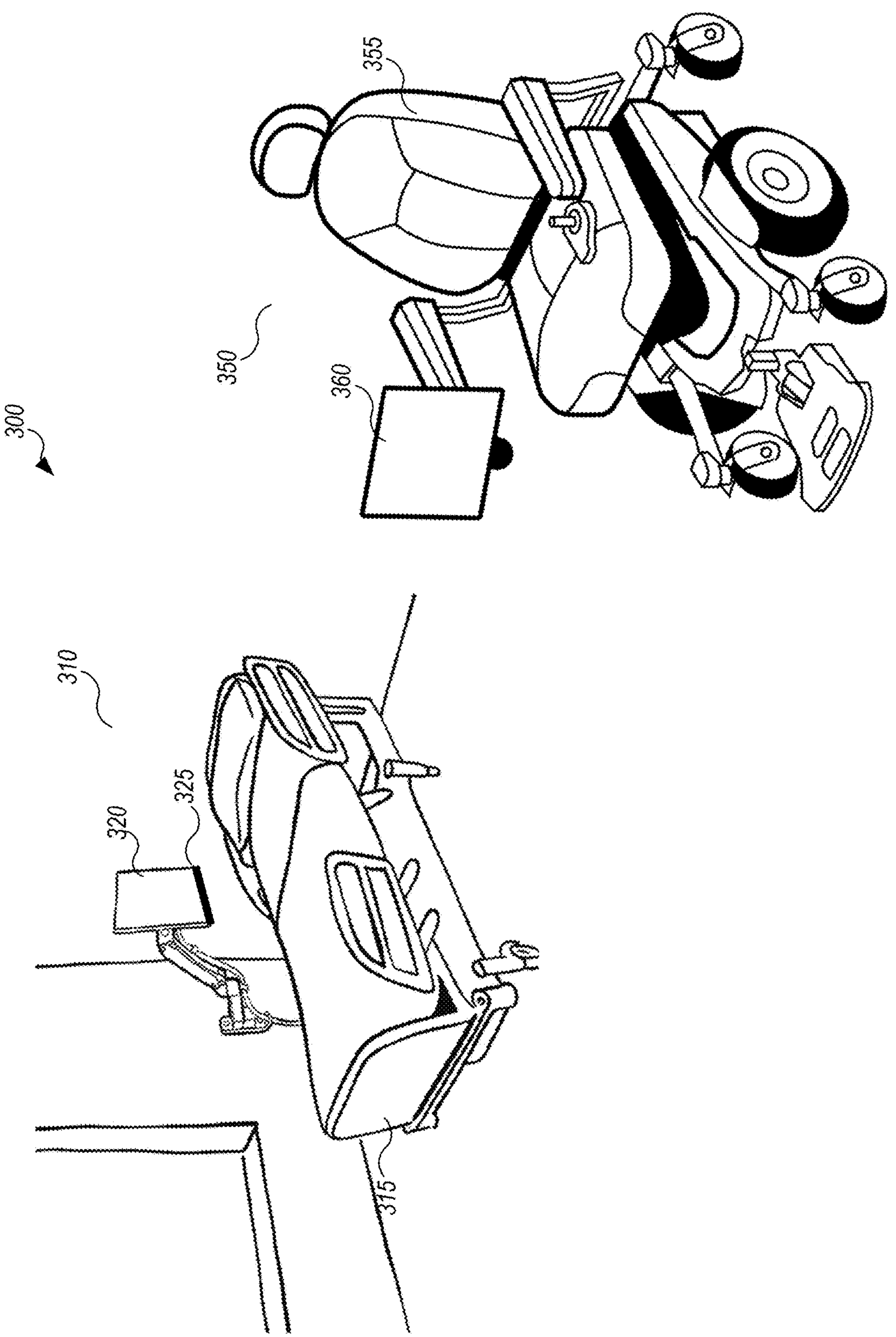
FIG. 3 is an example block diagram of an example powered hospital bed with powered adjustable positioning and an example powered wheelchair with powered adjustable seating and motion controlled via an example Eye Gaze Actuator Control System.

FIG. 3 is an example block diagram of an example powered hospital bed with powered adjustable positioning and a powered wheelchair with powered adjustable seating and motion controlled via example Eye Gaze Actuator Control System. These components include a powered repositionable bed 315, a display 320, eye gaze sensors 325, and other components. In some examples, the display 320 and eye gaze sensors 325 could be mounted to the bed frame, a wall, ceiling, or floor mount. In other examples, the display 320 and eye gaze sensors 325 can be head-mounted through systems referred to as 'augmented reality glasses' or 'virtual reality goggles.' Other configurations are possible. Some example implementations are linear actuators embedded in the bed frame and attached to movable joints below the bed mattress that allow the head, back, feet, and knees to be repositioned. Other examples may include actuators that provide pneumatic pressure such as blood constricting cuffs used to promote healthy circulation in the extremities or other aspects of weight/pressure management such as side to side motion or pressure control pneumatic pads that are inflated/deflated to provide changing pressure over time to help mitigate skin pressure sores. Another example implementation is a powered wheelchair 350, with a mounted display 360, with powered seating 355.

Figure 4:
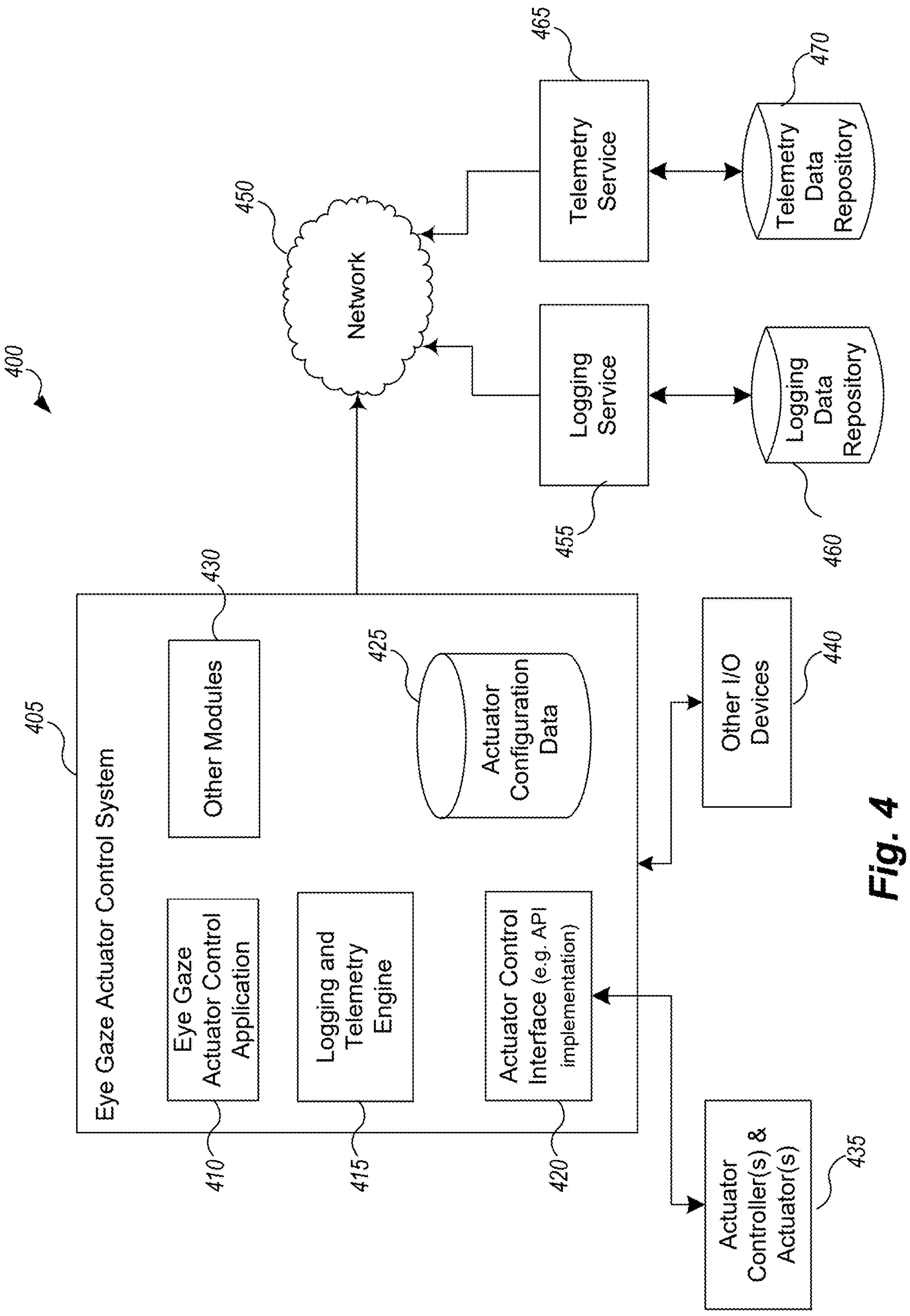
FIG. 4 is an example block diagram of components of an example Eye Gaze Actuator Control System.

FIG. 4 is an example block diagram of components of an example Eye Gaze Actuator Control System. In one example embodiment, the EGACS comprises one or more functional components/modules that work together to control actuators of different types using eye gaze technology and intentional gaze determination ("IGD") algorithms as opposed to "manual" (hand) control. For example, an example Eye Gaze Actuator Control System 405 may comprise an EGACS application 410 that interacts with the user, eye gaze actuation control logging and telemetry engine/logic 415, an actuator control interface 420 which facilitates communicating actuation commands from the EGACS application 410 to the actuation controllers and actuators 435, other modules 430, and actuator control and configuration data 425.

The eye gaze actual control system 405 is code logic for reading a stream of data points containing eye status, gaze vector, and/or projected X/Y intersection coordinates in the attention area as calculated from the eye gaze sensor's view of the face and eyes (e.g., eye gaze sensors 210 and 325). These coordinates are calculated using algorithms described elsewhere, as many are developed by third parties who typically make eye gaze camera devices. For example, in dark pupil eye tracking algorithms, polynomial transformations are used to calculate the vectors for gaze direction and head orientation and these vectors are then used to project the intersection point of the eye gaze onto the 2D plane of the display surface. See, for example, Kar, A. and Corcoran, P., "*A Review and Analysis of Eye-Gaze Estimation Systems, Algorithms and Performance Evaluation Methods in Consumer Platforms,*" accepted for publication in IEEE ACCESS. DOI 10.1109/ACCESS.2017.2735633, available at "https://arxiv.org/ftp/arxiv/papers/1708/1708.01817.pdf," which is incorporated herein by reference in its entirety. Typically, systemic and random errors occur in the stream of data points due to external signal interference (e.g., light sources, reflections, sunlight) or camera noise, with data variations 'smoothed' out of the data stream using a noise reduction technique such as a Kalman or other noise reduction filter.

The EGACS application 410 uses the stream of data points to determine when an intersection with the attention area and/or visual target occurs. The stream of data points is then used to determine activation/deactivation of visual targets based on conditions described in the flowcharts in FIGS. 11A-C, described below. Visual target activation/deactivation results in calls to the actuator control interface 420, which result in actuation with examples such as seating/posture changes in a hospital bed 315 or translational movement/posture changes of a powered wheelchair 355.

The logging and telemetry engine 415 interacts with (in some embodiments external) logging services 455 to collect and log data in the logging data repository 460, such as preferences, events, device interactions, warnings, and errors that are used to manage, understand, improve, and debug the EGACS. Logging data includes data such as system diagnostics, software and hardware versions, and observations of the system under normal use and exceptional situations or failures. Similarly, the logging and telemetry engine 415 interacts with (in some embodiments external) telemetry services 465 to collect and log telemetry data in the telemetry data repository 470. Telemetry data includes data such as system activation, active usage, positioning activations, and movement actuations. Telemetry data is used to observe and report on the utilization and efficacy of the EGACS. Telemetry is of interest, for example, to the person using the device, the manufacturer of the powered seating device, the assistive technology clinicians who recommend the device, and the medical practitioners responsible for advising the person on health and injury matters. Components such as the logging service 455, the telemetry service 465 and other applications interface with the EGACS 405 via network 450, e.g., a wide area network such as the Internet or a local area network.

The eye gaze actuator control application 410 is responsible for directly interacting with the user via eye gaze technology to select which aspect of the movable device is to be adjusted and in what way, for example, degree of angular rotation, position of linear actuation, or speed of wheels or other drive systems used to propel/steer the device.

Actuator control interface 420 interacts with the various actuation controllers and actuators 435 and other I/O devices 440 to cause the device to move according to the end user selections. Example of such interfaces include the Permobil M3 Corpus Powered Wheelchair (see "https://www.permobil.com/en-us/products/power-wheelchairs/permobil-m3-corpus") Permobil Corpus Seating System (see "https://www.permobil.com/en-us/products/power-wheelchairs/functions/corpus-seating-system"), Invacare G-Series hospital bed (see "http://www.invacare.com/cgi-bin/imhqprd/inv_catalog/prod_cat_detail.jsp? prodID=G5510"), Linak HB22 linear actuator (see "https://cdn.linak.com/-/media/files/user-manual-source/en/homeline-twindrive-td1-220-250-user-manual-eng.pdf"), Drive Delta 1000 Hospital Bed, and Curtis-Wright RNet Power Module (see "https://www.cw-industrialgroup.com/Products/Mobility-Vehicle-Solutions/R-net/Standard-Power-Module"). There may be an intermediary position controller which acts as a translation device between the tablet computer's USB port and the powered seating actuator which may use simple physical switch input (e.g., normally open switches) or a low-level microcontroller optimized protocol such as RS-422, RS-232, or CAN Bus.

In some example EGACSes 400, certain actuator configuration data 425 is also stored in a data repository. Such data may aid in configuration defaults, stored end user information available to the EGACS application 410, and the like.

Figure 5:
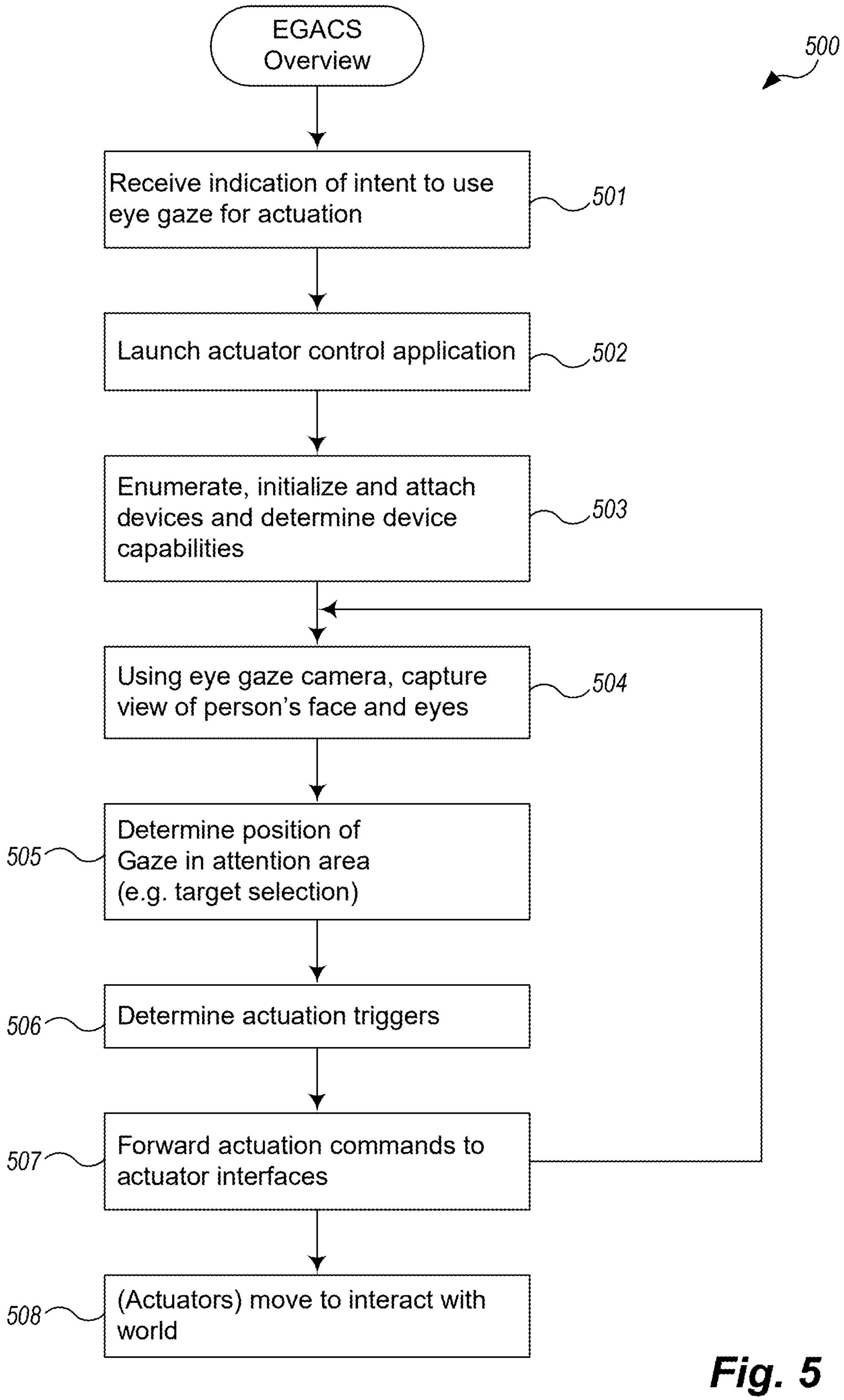
FIG. 5 is an overview flow diagram of an example Eye Gaze Actuator Control System.

FIG. 5 is an overview flow diagram of an example Eye Gaze Actuator Control System. An example EGACS, such as EGACS 400 of FIG. 4, is responsible for interfacing with an end user to provide improved self-control of powered devices via eye gaze technology to adjust aspects such as, in a powered chair or bed, vertical control of the seat (lift), the angle of the legs, the angle of the back rest (the recline angle), and the angle of the chair to the base (tilting), and the like. Another example EGACS provides translational motion (e.g., movement forward/back and steering of a powered wheelchair). The various components of the EGACS 400 shown in FIG. 4 interact to achieve these adjustments. The EGACS may be part of a larger eye gaze system which provides other functions such as controlling a computer or web browser, speaking, controlling home devices like lamps, shades, and doors through home automation, and the like.

More specifically, in block 501, the EGASC receives an indication of (an end user's) intent to use eye gaze for actuation control. This indication may come in a variety of forms and from a variety of scenarios, dependent upon how the EGACS is integrated into an actuation device such as a powered wheelchair or bed. Example integrations are described further below with respect to FIGS. 6-8.

In block 502, the EGACS launches an actuator control application to interface with the end user using eye gaze technology. An example actuator control application is described further below with respect to FIGS. 7, 8, and 11A-11B. The actuator control application allows the user to select an actuator to adjust and the specifics of the adjustment using eye gaze technology without any need to involve additional sources of input such as from a virtual mouse or keyboard or assistance from a caregiver. As explained above, this results in enhanced independence to the disabled end user.

In block 503, the EGACS engages in a discovery and connection process to attach various devices (such as devices 435 shown in FIG. 4) using an actuator control application programming interface "API" (such as API 420) used to control actuation adjustments. Example devices for possible enumeration are described below with reference to FIG. 9. The logic of block 503 may be accomplished by using known technology such as USB device discovery, Ethernet & Link Level Discovery Protocol, Internet Protocol Multicast DNS, Bluetooth, Wi-Fi, etc.

In block 504, the EGACS uses eye gaze camera(s) (e.g., cameras 210, 325) to capture the end user's face and eyes. This input is used in block 505 to determine the gaze vector of the end user, whether that gaze vector intersects the defined attention area as described in FIG. 12. Examples of eye gaze capture technology that may be incorporated for this logic include Tobii IS5 based eye trackers, devices from EyeTech Digital Systems, RGB eye tracking such as WebGaze from Brown University, and the like.

Figure 9:
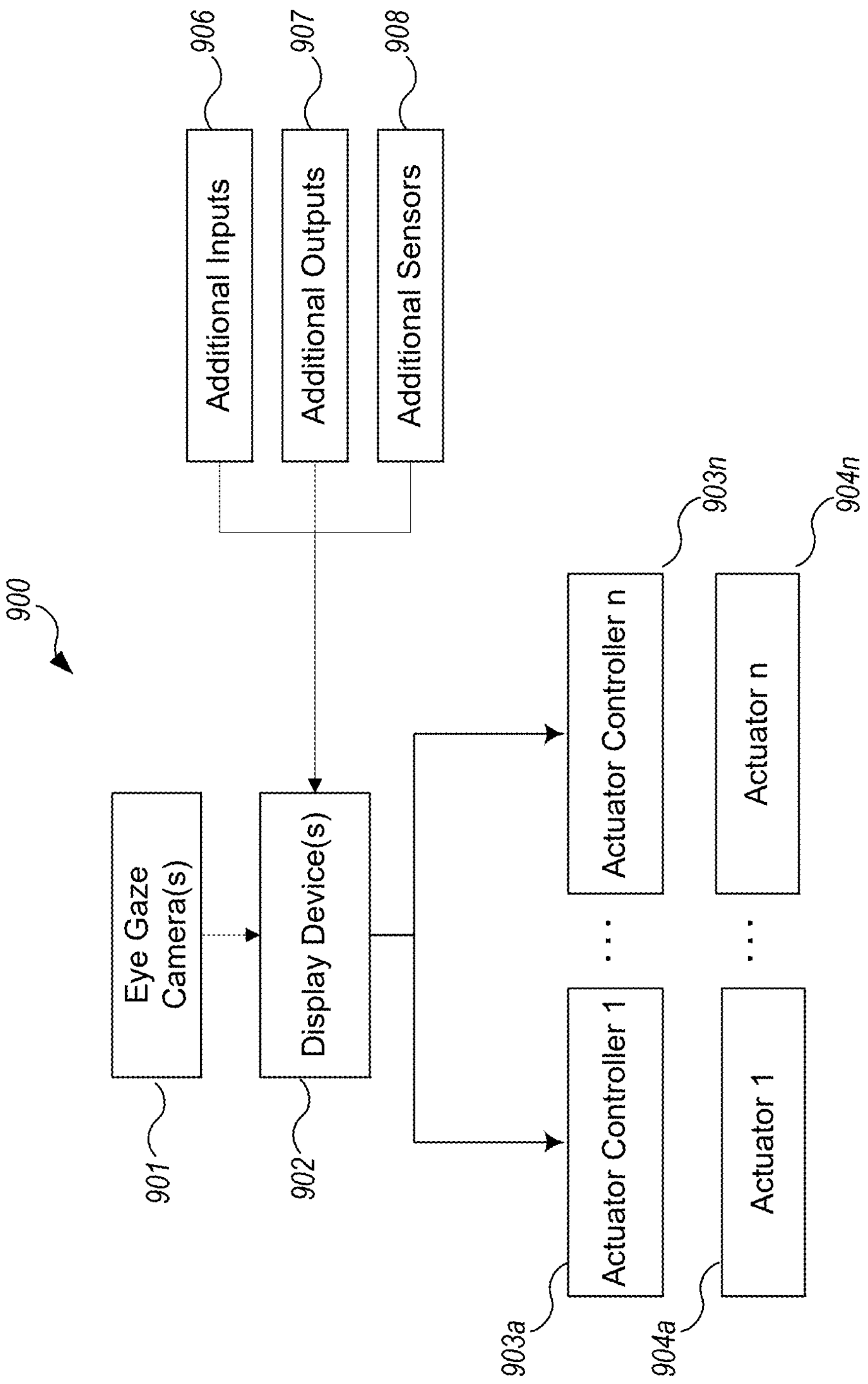
FIG. 9 is an example block diagram of devices available for enumeration and attachment by an example Eye Gaze Posture Control System.

In blocks 505 and 506 the EGACS determines which visual targets are intersected by the gaze vector and being triggered by the end user to perform an actuation. The flow diagram describing this intersection and activation/deactivation process of visual targets is described in FIGS. 11A-11C. A visualization of this process is described with respect to FIG. 12, which shows the gaze vector intersecting the attention area and a visual target resulting in an activated visual target. In some example EGACS implementations, the EGACS may use additional information from, for example, other modules, other I/O devices, additional inputs, and additional sensors (e.g., FIG. 4: other modules 430 and other I/O devices 440; FIG. 9: additional inputs 906 and additional sensors 908) to prevent the user from adjusting actuators that could result in harmful outcomes. For example, using such information, the EGACS may present posture changes that endanger the user by placing stress on breathing assistance systems or navigating a powered wheelchair into a harmful outcome such as driving off a curb. In other example EGACS implementations, the EGACS recommendations are considered just that—recommendations—and the end user is presented with the information and an ability to accept or override the recommendations. Other combinations are possible as well.

In block 507, once the actuator adjustment has been triggered, the EGACS forwards commands to the actuators to cause the device to move or to change position according to the end user selections. Blocks 506 and 507 are executed as part an actuator control application, described further below with respect to FIGS. 11A-11C.

In block 508, the actuators, upon receiving commands from the actuator control application, move or translate the device position in kind.

Figure 6:
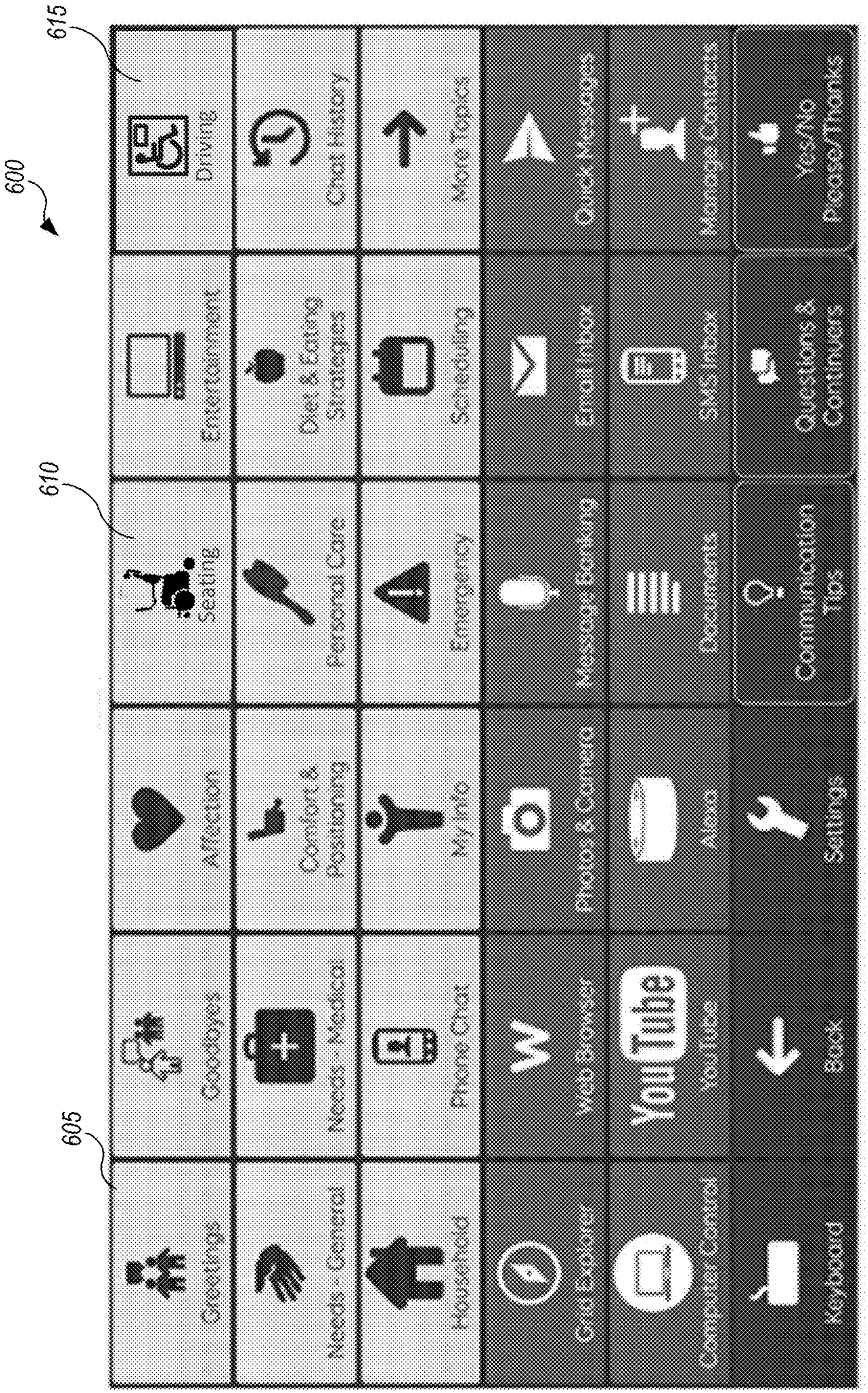
FIG. 6 is an example screen display of an integration within a third-party user interface of an example Eye Gaze Actuator Control System to select possible user functionality.

FIG. 6 is an example screen display of integration within a third-party user interface of an example Eye Gaze Actuator Control System to select possible user functionality. The screen display of Eye Gaze application 605 shows Grid 3 software from Smartbox Assistive Technology Ltd. The EGACS is integrated into the interface by adding a visual targets 610 (seating) user interface control and a driving user interface control 615 to the display screen 605 of applications and utilities for a variety of communications and utilities for personal needs which are eye gaze navigable.

Figure 7:
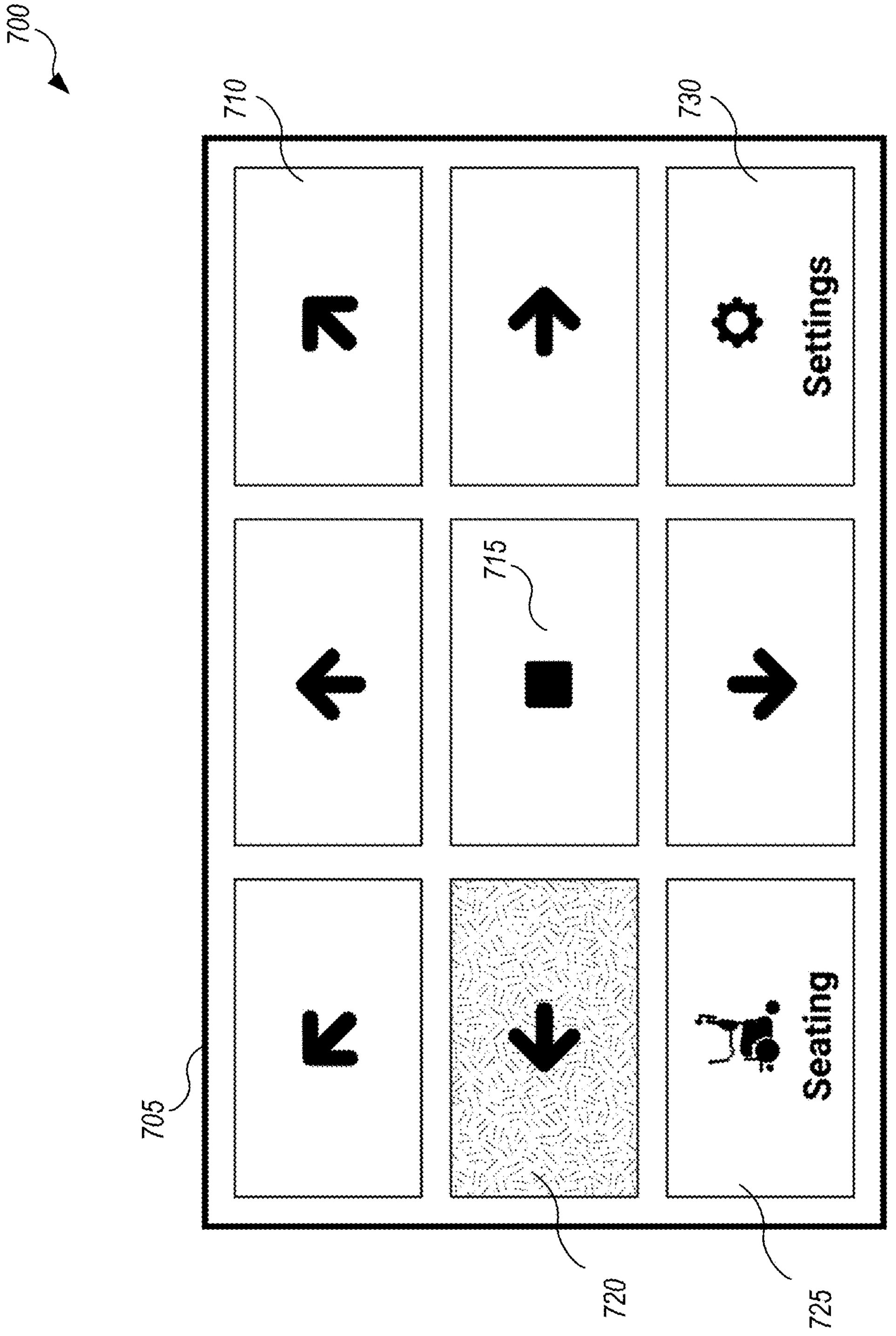
FIG. 7 is an example screen display of integration within a third-party user interface for powered wheelchair control from which an example Eye Gaze Actuator Control System selects possible user functionality.
Figure 8:
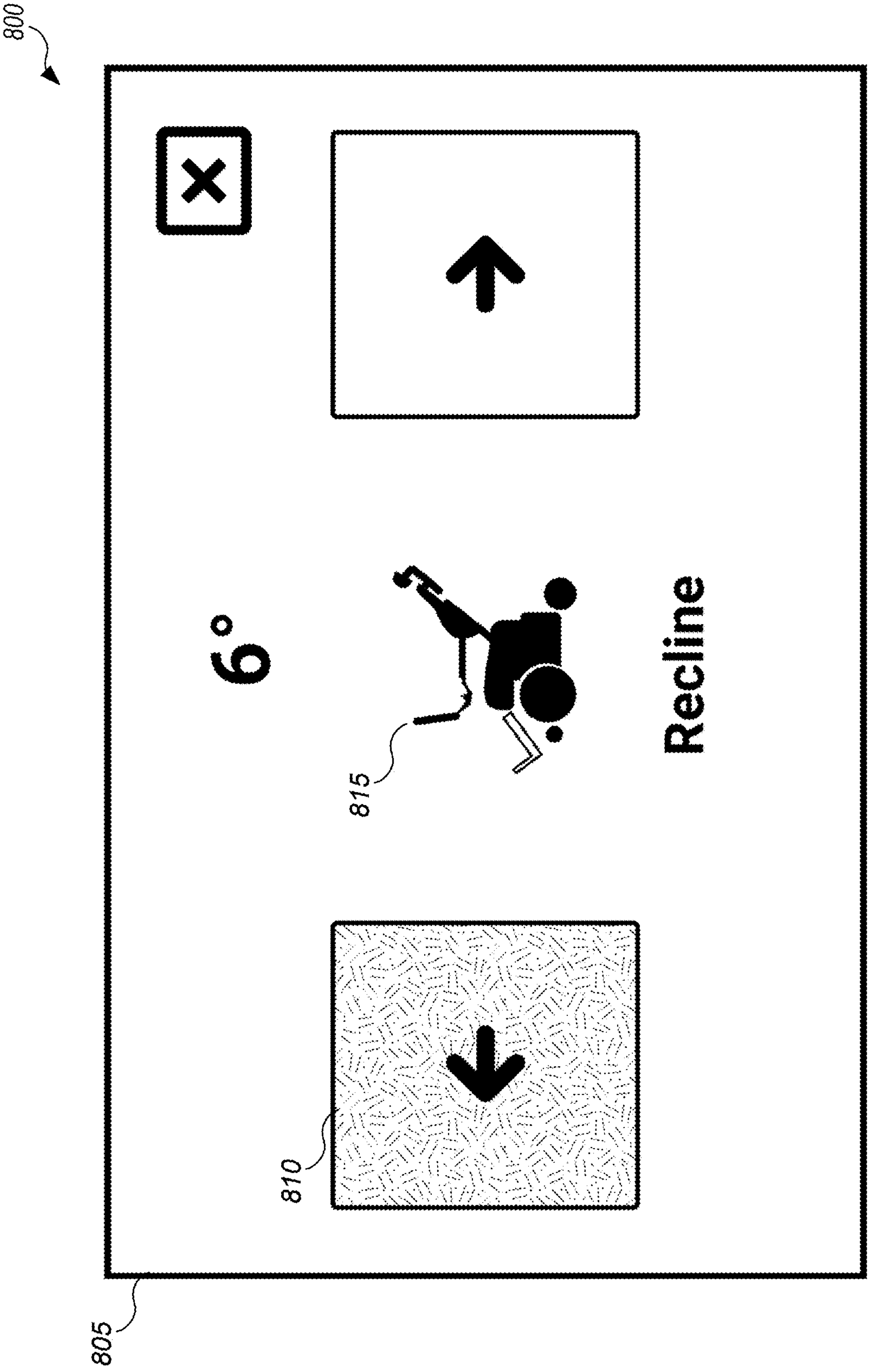
FIG. 8 is an example screen display of integration within a third-party user interface for powered seating control in an example Eye Gaze Actuator Control System.

FIGS. 7 and 8 are example screen displays of a user interface which uses an example Eye Gaze Actuator Control System to select possible user functionality. FIG. 7 is an example screen display of integration within a third-party user interface for powered wheelchair control from which an example Eye Gaze Actuator Control System selects possible user functionality. Example screen display 705 shows an interface currently available in the market from Tolt Technologies, called "Ability Drive", which is used to control wheelchair driving and seating. The Eye Gaze Posture Control System from U.S. patent application Ser. No. 17/495,776 is integrated into the user interface of Ability Drive through a user interface control 725, labeled "seating." Visual target 725 is selectable through eye gaze recognition and interaction technology as described above and using the EGACS and is used to advance the user to a posture adjustment selection user interface. The other eye gaze selectable visual targets shown with directional arrows, such as visual targets 715 and 720 are used for driving the wheelchair. Visual target 715 can be selected to stop movement of the wheelchair and visual target 720 turns the wheelchair to the left. Visual target 730 can be selected to adjust the EGACS settings.

Upon user selection of the user interface control 725 ("seating"), another user interface is presented to enable the user to adjust the seating. FIG. 8 is an example screen display of integration within a third-party user interface for powered seating control in an example Eye Gaze Actuator Control System. Example screen display 805 shows an interface which is used to control powered seating on a wheelchair. Visual target 810, a left arrow, is used to adjust the seating recline to a shallower angle. Visual element 815 is for information only to show the user which actuation axis is currently active for change, in this case the seating recline position actuator is selected as noted by the label underneath the visual element. An interface for a hospital bed or other motorized vehicle can be similarly incorporated. More complicated user interfaces can be envisioned, such as an EGACS which controls multiple actuators or outputs at once (e.g., driving movement, turn signals, lighting, warning horns, etc.)

FIG. 9 is an example block diagram of devices available for enumeration and attachment by an example Eye Gaze Actuator Control System. For example, in block 503 of FIG. 5, the EGACS engages in a discovery and connection process to attach one or more of the devices shown in FIG. 9. The devices available to be enumerated, attached, and initiated may include one or more eye gaze cameras 901, display devices 902, actuator controllers 903*a*-903*n*, and actuators 904*a*-904*n*. The system may also contain additional inputs 906 and sensors 908 which provide information to the EGACS which can be used for safety, navigation/actuation context, or other purposes. The display device 902 may contain a CPU 1003 running other modules 430 which analyze the data from inputs 906 and sensors 908 to perform an actuation safety check 1142.

The eye gaze camera(s) 901 may be a ‘smart camera’ which includes an image capture device, a light emitter, and optionally an image or geometric co-processor; a ‘RGB or infrared or web’ camera, which is simply an image capture device which relies on a separate CPU, perhaps integrated with the display device or attached elsewhere in the system; a series of cameras mounted in the AR/VR display; or one or more cameras mounted on our around the environment, separate from the display 902.

The display device(s) 902 may take many forms such as: a tablet PC like a Microsoft Surface Pro, Apple iPad, or Android Tablet; a phone like an Android phone or Apple iPhone or other smartphone; a dedicated display such as an LCD or LED monitor or similar display device; or a head mounted display such as AR (Augmented Reality) glasses or VR (Virtual Reality) googles. The eye gaze display 902 may take the form of a computer system which runs an operating system with additional eye gaze interaction software enhancements. These enhancements can take the form of input simulation (e.g., a virtual mouse, such as displayed in FIG. 8) or an eye gaze enhanced navigation experience (e.g., eye gaze enabled grids of buttons, such as displayed in FIG. 7, or integrated with a powered wheelchair driving app, for example displayed in FIG. 6). In some example implementations, such as a hospital bed in a hospital room (e.g., FIG. 3), the operating system may run in a background and an application may be run as a dedicated application on the device, for example in a “kiosk mode”. In other configurations, a running application such as a positioning application or a wheelchair movement navigation application may be part of a larger, more wholistic system that includes other functionality, such as speech generation assistance, environmental control, etc. In this case, the operating system with eye gaze interaction can be used to navigate between the applications and the other assistive functionalities of the eye gaze enabled display.

Actuation controllers 903*a*-903*n* comprise one or more “bridge” devices that connect the display device (902) to the actuator(s) (904*a*-904*n*). Since many actuation controller(s) (904*a*-904*n*) are designed to be activated using manual buttons via a remote control (e.g., see FIG. 1), the actuation controller(s) (903*a*-903*n*) can take the form of a wired or wireless (e.g., USB or Bluetooth) device which communicates with the operating system/I/O system of the display device(s) 902 and provides a protocol to actuate by acting as normally open switches (the common physical implementation of the manual buttons on a remote control). This may be implemented using a physical relay switch device, a solid-state relay, or an opto-isolated solid-state relay. The actuation controller(s) (903*a*-903*n*) are provided as part of the motorized bedding or seating device and are generally implemented as a motor controller that takes AC or DC power, handles one or more motors or linear actuators (actuators 904*a*-904*n*), and has an input system which may consist of a hard-wired button controller or a control port such as an RJ11 jack or DB9 port. These actuators 904*a*-904*n* may be implemented as AC or DC motors but are not limited to these, as other options such as pneumatic, hydraulic, or other variations. Actuators can be used to control seating such as posture positioning, seat height (e.g., seat elevators), seat lean (e.g., forward tilt), seat to standing support (e.g., standing wheelchairs). Actuators can control wheelchair movement & turning for independent navigation. Actuators can also control camera view (e.g., pan/tilt/zoom), head/neck support control such as ‘tilt head forward/tilt head back’, etc.

Additional inputs 906, outputs 907, and sensors 908 may similarly be incorporated into the EGACS. For example, inputs 906 may include switches used to provide additional input control (e.g., selection or mouse clicks), combinations or arrays of inputs to maximize the independent control of partial disabilities (e.g., eye gaze plus click), speech recognition (e.g., “lift legs”), muscle tensing/nerve actuation (e.g., EMI or EEG) sensors, brainwave detection (e.g., BCI) sensors, and the like. Additional outputs 907 can be used to control other aspects of movement, such as camera selection such as ‘forward view camera’ & ‘rear view camera’, visual, or audio output (e.g., lights or horns), gaming consoles, entertainment devices such as televisions or music players, etc. Additional sensors 908 may include cameras, obstacle detection sensors (e.g., sonar, radar, ladar, structured IR light, stereoscopic vision, optical flow, etc.), collision or cliff/fall avoidance sensors, navigation sensors (e.g., GPS or electromagnetic triangulation), and the like.

The techniques of Eye Gaze Actuator Control System are generally applicable to any type of device that a user can occupy and that can be controlled to change the user’s position in the device, for example by moving, tilting, raising, lowering, etc. Also, although the examples described herein often refer to a powered wheelchair, the techniques described herein can also be used in beds, cars, and other transportation devices such as cars, boats, trains, and other vehicles. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement Eye Gaze Actuator Control System to be used to control seating and lying posture through eye gaze control. Other embodiments may incorporate the use of brain-computer interface (BCI) technologies to provide input instead of or in addition to using eye gaze control. BCI technologies are described further in Nicolas-Alonzo and Gomez-Gil, “*Brain Computer Interfaces, A Review,*” Department of Signal Theory, Communications and Telematics Engineering, University of Valladolid, Valladolid 47011, Spain, “https://www.ncbi.nlm.nih.gov/pmc/articles/PMC3304110/pdf/sensors-12-01211.pdf,” which is herein incorporated by reference in its entirety. An example BCI device is the Emotive Insight 5 headset, available at “https://www.emotiv.com/insight/.” Similarly, other embodiments may incorporate the use of EMG (electromyography) technology to provide input instead of or in addition to using eye gaze control. EMG technologies are described further in Lee et al., "*Biological Surface Electromyographic Switch and Necklace-type Button Switch Control as an Augmentative and Alternative Communication Input Device: A Feasibility Study,*" Australasian Physical & Engineering Sciences in Medicine, Vol. 42(5), June 2019, which is herein incorporated by reference in its entirety. An example EMG switch implementation is NeuroNode by Control Bionics, available at "https://www.controlbionics.com/products/."

Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the order, selection, or decomposition of aspects described with reference to any particular routine, module, component, and the like.

Figure 10:
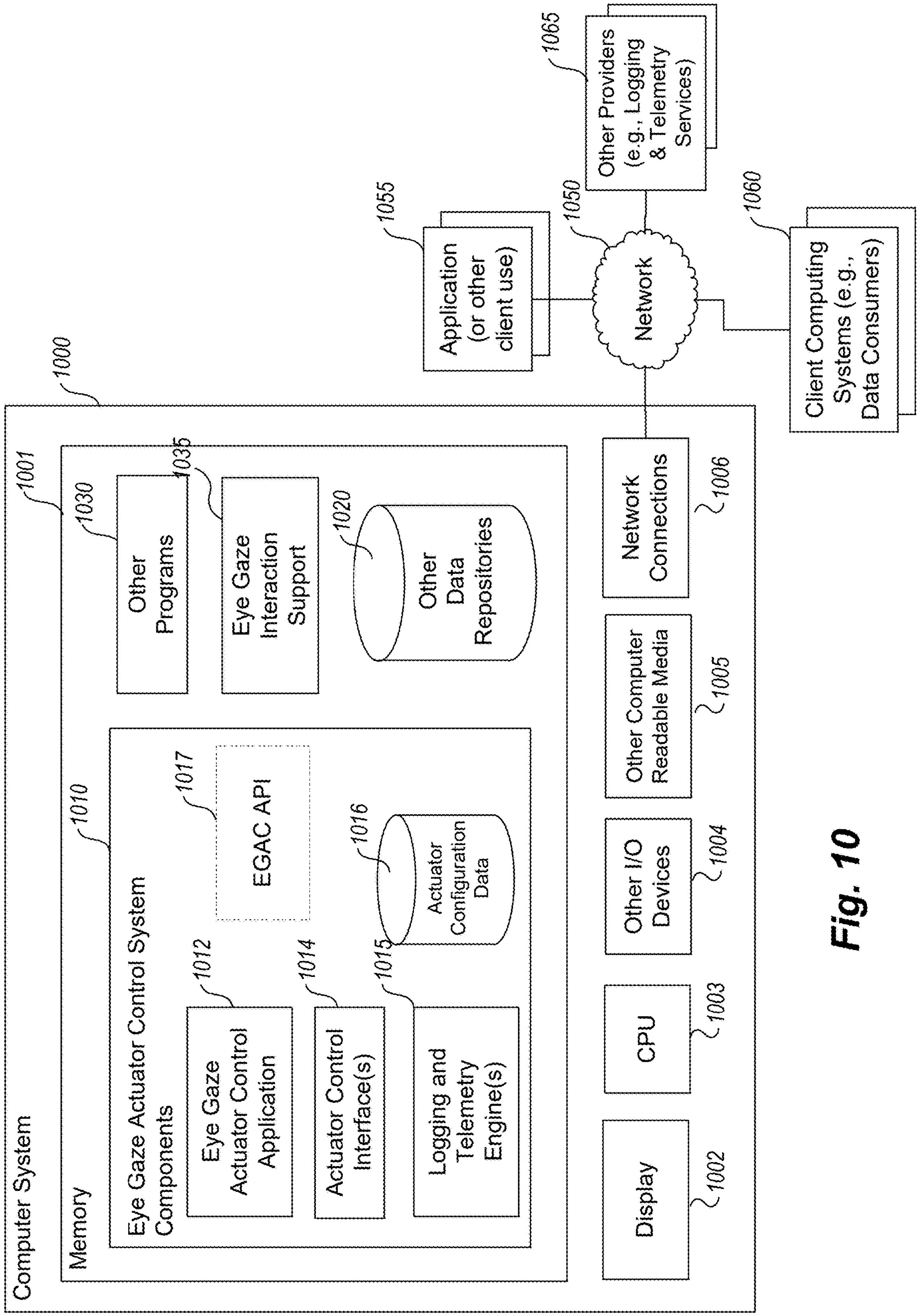
FIG. 10 is an example block diagram an example block diagram of a computing system for practicing embodiments of an Eye Gaze Actuator Control System.

FIG. 10 is an example block diagram of a computing system for practicing embodiments of an Eye Gaze Actuator Control System described herein. Note that one or more general purpose virtual or physical computing systems suitably instructed or a special purpose computing system may be used to implement an EGACS. Further, the EGACS may be implemented in software, hardware, firmware, or in some combination to achieve the capabilities described herein.

Note that one or more general purpose or special purpose computing systems/devices may be used to implement the described techniques. However, just because it is possible to implement Eye Gaze Posture Control System on a general-purpose computing system does not mean that the techniques themselves or the operations required to implement the techniques are conventional or well known.

The computing system 1000 may comprise one or more server and/or client computing systems and may span distributed locations. In addition, each block shown may represent one or more such blocks as appropriate to a specific embodiment or may be combined with other blocks. Moreover, the various blocks of the EGACS 1010 may physically reside on one or more machines, which use standard (e.g., TCP/IP) or proprietary interprocess communication mechanisms to communicate with each other.

In the embodiment shown, computer system 1000 comprises a computer memory ("memory") 1001, a display 1002, one or more Central Processing Units ("CPU") 1004, Input/Output devices 1004 (e.g., keyboard, mouse, CRT or LCD display, etc.), other computer-readable media 1005, and one or more network connections 1006. The EGACS components 1010 (as described in FIG. 4) are shown residing in memory 1001. In other embodiments, some portion of the contents, some of, or all of the components of the EGACS 1010 may be stored on and/or transmitted over the other computer-readable media 1005. The components of the EGACS 1010 preferably execute on one or more CPUs 1003 and control actuators using eye gaze technology, as described herein. Other code or programs 1030 and potentially other data repositories, such as data repository 1020, also reside in the memory 1001, and preferably execute on one or more CPUs 1003. Of note, one or more of the components in FIG. 10 may not be present in any specific implementation. For example, some embodiments embedded in other software may not provide means for user input or display.

As described with reference to FIG. 4, in a typical embodiment, the EGACS 1010 includes an EGACS application 1012, one or more logging and telemetry engines 1014, and one or more actuator control interfaces that interact with the various actuators available as described with reference to FIGS. 5-9. In addition, the EGACS 1010 may store configuration data 1016, for example specific to a particular user or powered device set up. In at least some embodiments, the logging and telemetry engine 1015 is provided external to the EGACS and is available, potentially, over one or more networks 1050. Other and/or different modules may be implemented. In addition, the EGACS may interact via a network 1050 with application or client code 1055, for example a healthcare worker monitoring application that uses results computed by the EGACS, one or more client computing systems 1060, for example those that use the data provided by the logging and telemetry engine 1015, and/or one or more third-party information provider systems 1065, such as third-party logging and/or telemetry services. Also, of note, the configuration data repository 1016 may be provided external to the EGACS as well, for example in a data repository accessible over one or more networks 1050.

For example, one potential client computing system 1060 may be a data consumer that forwards/consumes telemetry data which is bridged into a larger electronic medical records system. Another data consumer 1060 or client application 1055 could be a private secured portal for the person and their caregivers. Another data consumer 1060 could be a notification system that sends suggestions or alerts to the person or their caregivers to assist with repositioning monitoring and needs. Telemetry services 1065 could be consumed by the manufacturer of the system to understand system usage, diagnostics, and provide support or by the owner of the system, an assisted living facility, or a hospital IT staff.

In an example EGACS, components/modules of the EGACS 1010 are implemented using standard programming techniques. For example, the EGACS 1010 may be implemented as a "native" executable running on the CPU 103, along with one or more static or dynamic libraries. In other embodiments, the EGACS 1010 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces 1017 to the data stored as part of the EGACS 1010 (e.g., in the data repositories 1016) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 1016 may be implemented as one or more database systems, file systems, or any other technique for storing such information, or any combination of the above, including implementations using distributed computing techniques.

Also, the example EGACS 1010 may be implemented in a distributed environment comprising multiple, even heterogeneous, computer systems and networks. Different configurations and locations of programs and data are contemplated for use with techniques of described herein. In addition, the components may be physical or virtual computing systems and may reside on the same physical system. Also, one or more of the modules may themselves be distributed, pooled, or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an EGACS.

Furthermore, in some embodiments, some or all of the components of the EGACS 1010 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 11A:
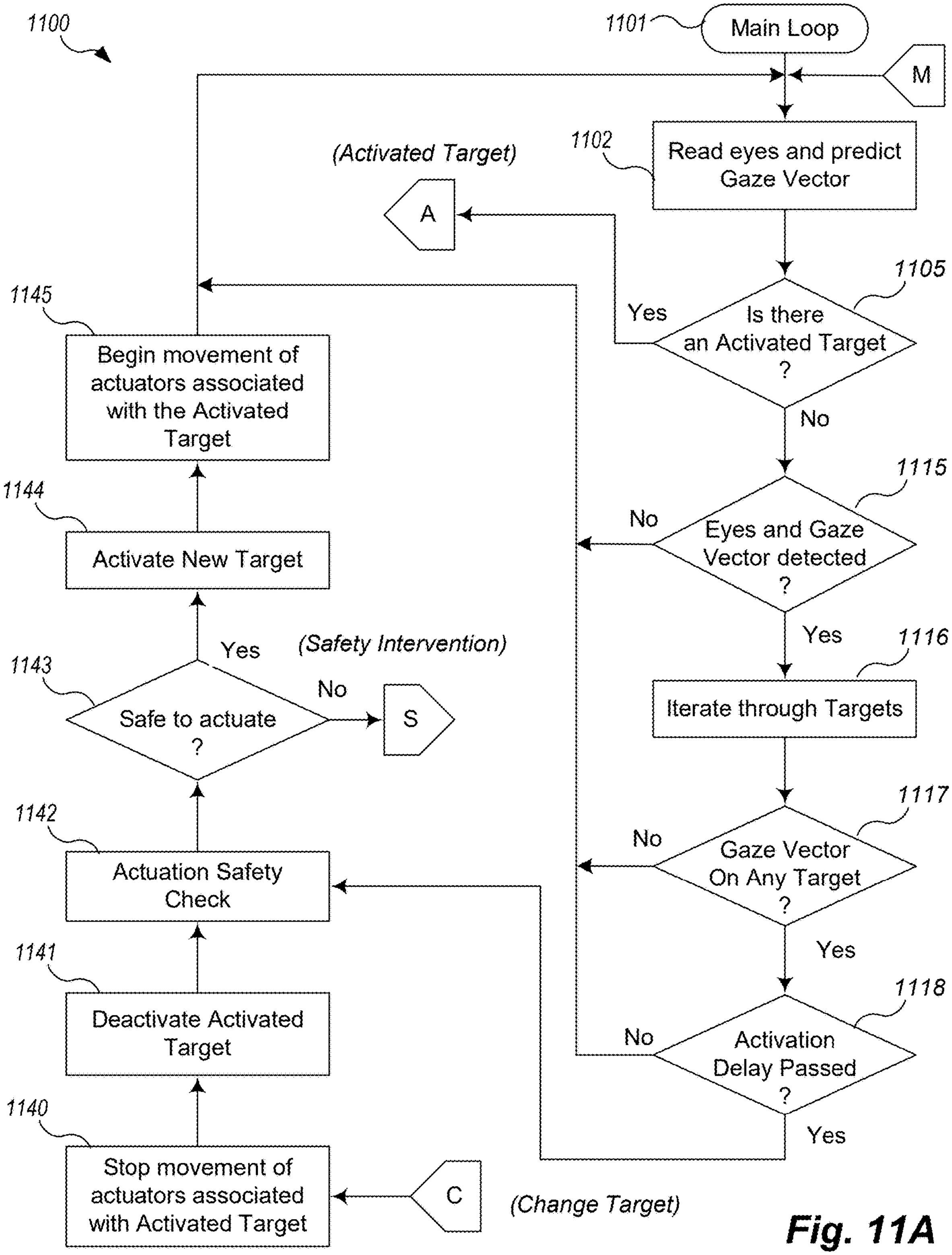
FIGS. 11A-11C are an example flow diagram of the integrated gaze determination algorithms of an Eye Gaze Actuator Control System.
Figure 11B:
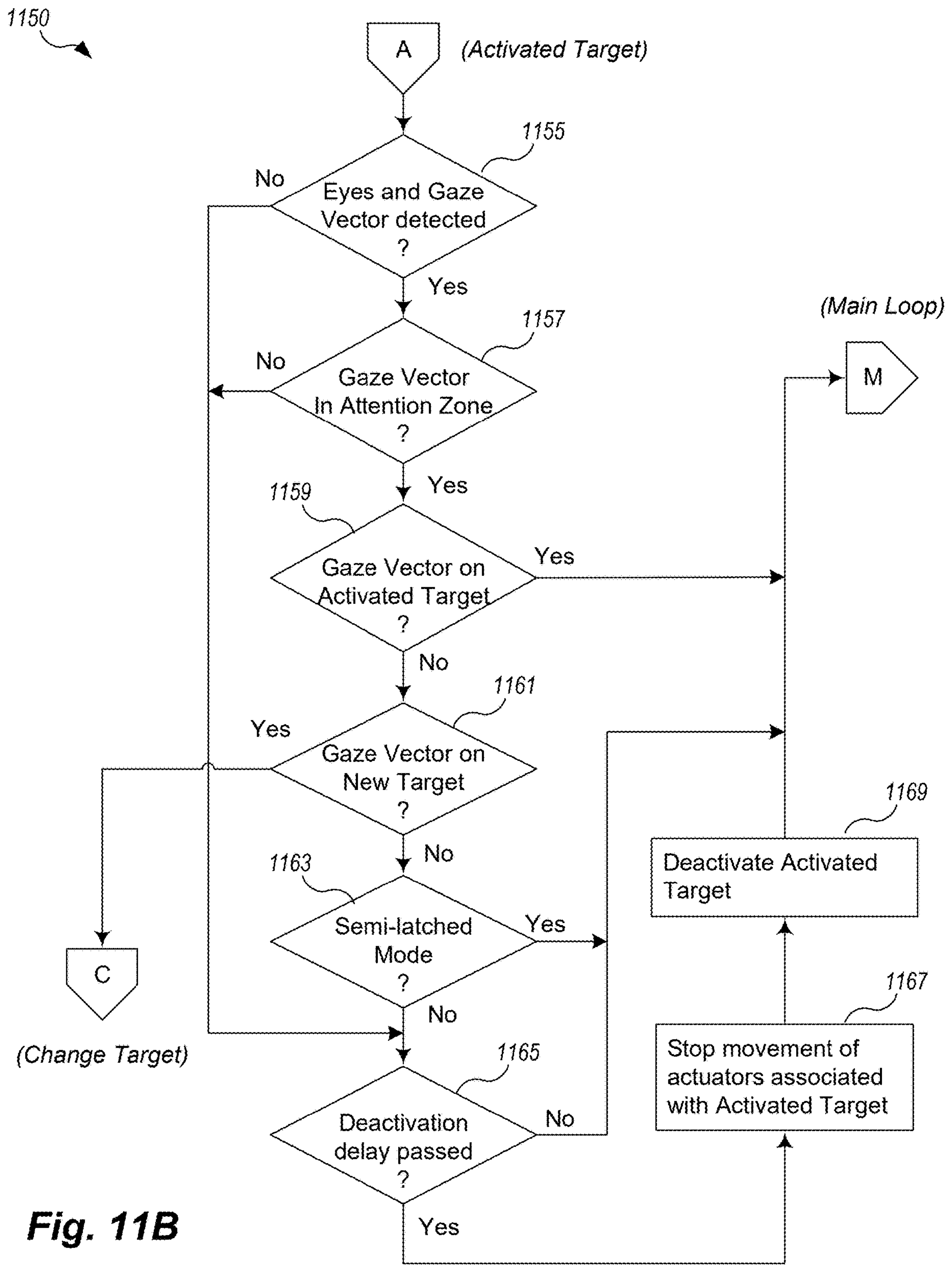
Figure 11C:
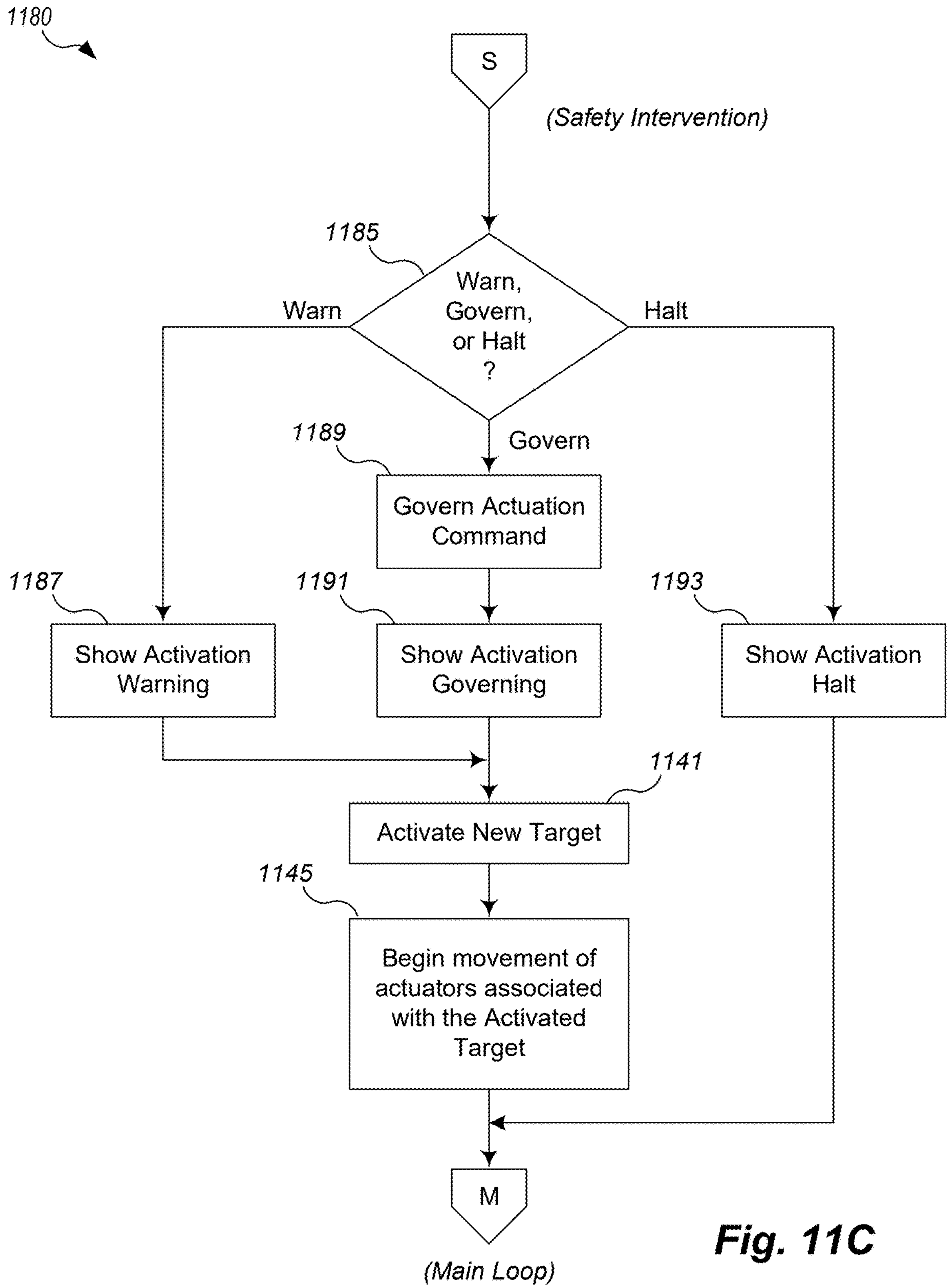

FIGS. 11A-11C are an example flow diagram of the integrated gaze determination algorithms of an example Eye Gaze Actuator Control System. This figure is described in three parts 11A (reading eye gaze data, determining eye gaze vector intersection on targets, and activating targets), 11B (acting upon an active target), and 11C (safety intervention).

The IGD algorithm consists of a main logic loop that reads the eye gaze vector and determines whether that vector intersects the area of interest and visual targets and two subroutines (or equivalent programming constructs), chosen based on whether a control target is current activated or not, to deactivate a currently activated target or to activate a new target when sufficient intent is expressed. A third subroutine (or equivalent programming construct), safety intervention, is followed if potentially unsafe conditions for actuation are suspected.

Timing is used to distinguish intention from ephemeral or involuntary eye movement. For example, eye blinks last approximately 100 milliseconds and involuntary saccades towards unexpected stimulus like a moving object in the background take 20-200 milliseconds. Fixation, the pausing of the gaze vector on a visual target, for 100 milliseconds or more can indicate intention to act and removal of eye gaze from a target or attention area in excess of 333 milliseconds can be used to indicate intention to stop action. Attention areas and visual targets are described further with respect to FIGS. 12 and 13.

When the EGACS application (e.g., EGACS application 410 in FIG. 4) is started, for example from an EGACS application user interface display 605, devices such as actuators and sensors are detected and initialized (e.g., block 503 in FIG. 5). After this logic is complete, the EGACS application begins a processing loop described at a high level in FIG. 5 blocks 504-508. FIGS. 11A, 11B, and 11C describe these high-level steps in further detail.

More specifically, in FIG. 11A, the main loop 1101 runs continuously while the EGACS application is active. In order to provide precision control of actuation, the main loop should run at least 10 frames per second (e.g., once every 100 milliseconds) and preferably faster such as 30 frames per second. Each iteration of the main loop 1101 begins with in block 1102 with the logic to read eyes and predict the gaze vector. This logic in itself is an involved process that has many different approaches and implementations, so block 1102 is not described in detail here. (See, for example, the Kar and Corcoran reference described above). It also may involve one or more approaches noise filtering such as Kalman Filters or like variations in order to improve actuation control outcomes, also a potentially involved process that is not described here due to the many different approaches and implementations that may be involved.

The main loop 1101 then in block 1105 checks the state of the system: Is there an activated target, e.g., are we already in the process of actuating? The activated target is stored in 'Application State', e.g., temporary storage in the EGACS application 410, such as RAM (e.g., Random Access Memory). If so, the process 1101 branches to a decision tree described in FIG. 11B 1150 to decide whether to deactivate or change the Activated Target. If there is no Activated Target, then in block 1115, the logic continues to make the decision whether to activate a new Target and start a new actuation. The conditions necessary to activate a new target are the eye(s) and gaze vector must be detected (block 1115), the gaze vector must intersect any of the existing targets (blocks 1116 and 1117), and the activation delay must have passed (block 1118), e.g., the eyes have been fixated on the new target for a period of time. The activation delay should be short enough to allow precision control but long enough to prevent unintentional activation from unintentional or transitory eye movement such as involuntary saccades, involuntary movements (e.g., a sneeze), or ephemeral eye travel over a target as the eyes are moving to a new fixation destination (e.g., to the pet cat outside of the attention area). Empirical testing demonstrates that 100 milliseconds is a reasonable middle ground between precision control and unintentional activation, as this delay allows for the possibility of 10 actuations per second while removing the majority of ephemeral/unintentional false positive actuations. 10 actuations per second approaches human control potential, as observed in high-speed real-time games where professional athletes generally achieve an average of 350 actions per minute which is 5.8 actions per second (see Wikipedia, Actions per minute, "https://en.wikipedia.org/wiki/Actions_per_minute"). Other activation delay timing can be similarly accommodated.

After actuation intention is established, then in block 1142, an actuation safety check is performed and then, in block 1143, if a potential safety issue is detected, the application logic proceeds to execute a safety intervention logic in block 1180 (FIG. 11C). The actuation safety check 1142 may involve logic from other modules and other I/O devices (e.g., additional inputs and additional sensors such as those shown in FIGS. 4 and 9). These modules, inputs, and sensors are not described in detail here, but follow the pattern of environmental, collision, and safety systems that can be found detailed in technologies such as transport (automotive or airplane) automated safety systems or industrial (e.g., workplace safety systems for powered/automated assembly/construction) safety systems. Some example implementations include the Braze Mobility Blind Spot Sensors for Wheelchairs (see "https://brazemobility.com/blind-spot-sensor-systems/") and the Luci Smart Wheelchair system (see "https://luci.com/"). Additional examples of safety checks are: simple limit switches which are set to test for reaching a maximum range of motion on a linear or rotational axis, for example to prevent motion when a seat is raised to create a high center of gravity which may induce tipping or fall; angle of rotation limits to prevent the top of a seat or bed to be moved such that the head is lower than the heart which could increase blood pressure and induce fainting; measure of angle of rotation compared to gravity vector to prevent movement at a high angle which could induce tipping or falls; or movement of position outside of safe limits relative to other life sustaining devices such as artificial respirators or intravenous drip systems.

If no potential safety issue is detected in block 1143, then the new target is activated in block 1144 and the actuator associated with the target is actuated in block 1145. The information needed to translate a target being activated into associated actuator(s) is stored in the actuator configuration data (e.g., data repository 425 in FIG. 4) and is built based on application logic and settings which are part of the EGACS application and the information discovered during device enumeration initialization and capabilities. Once the actuator(s) associated with the target is determined, the actuator control interface (e.g., interface 420 in FIG. 4) issues the actuation command to the actuator controller(s) and actuator(s) (e.g., controllers and actuators 435 in FIG. 4).

Other, if in block 1143 a safety issue is detected, then the logic continues to employ a safety intervention and proceeds to block 1180 in FIG. 11C.

In FIG. 11B, the activated target subroutine 1150 is called from the main loop 1100 in block 1105 when the logic determines that there is an activated target. First, in blocks 1155 and 1157, the eye(s) and gaze vector are validated and confirmed to be in the attention area (see FIGS. 12, 1210). If they are not confirmed, the logic proceeds to block 1165 to determine whether the deactivation delay has passed. Second, in block 1159, the gaze vector is checked to see if it intersects the currently activated target, and if so, no action is taken, the currently activated target is left in place, and the subroutine returns to the main loop 1100. If not, the logic proceeds to block 1161.

Figure 12:
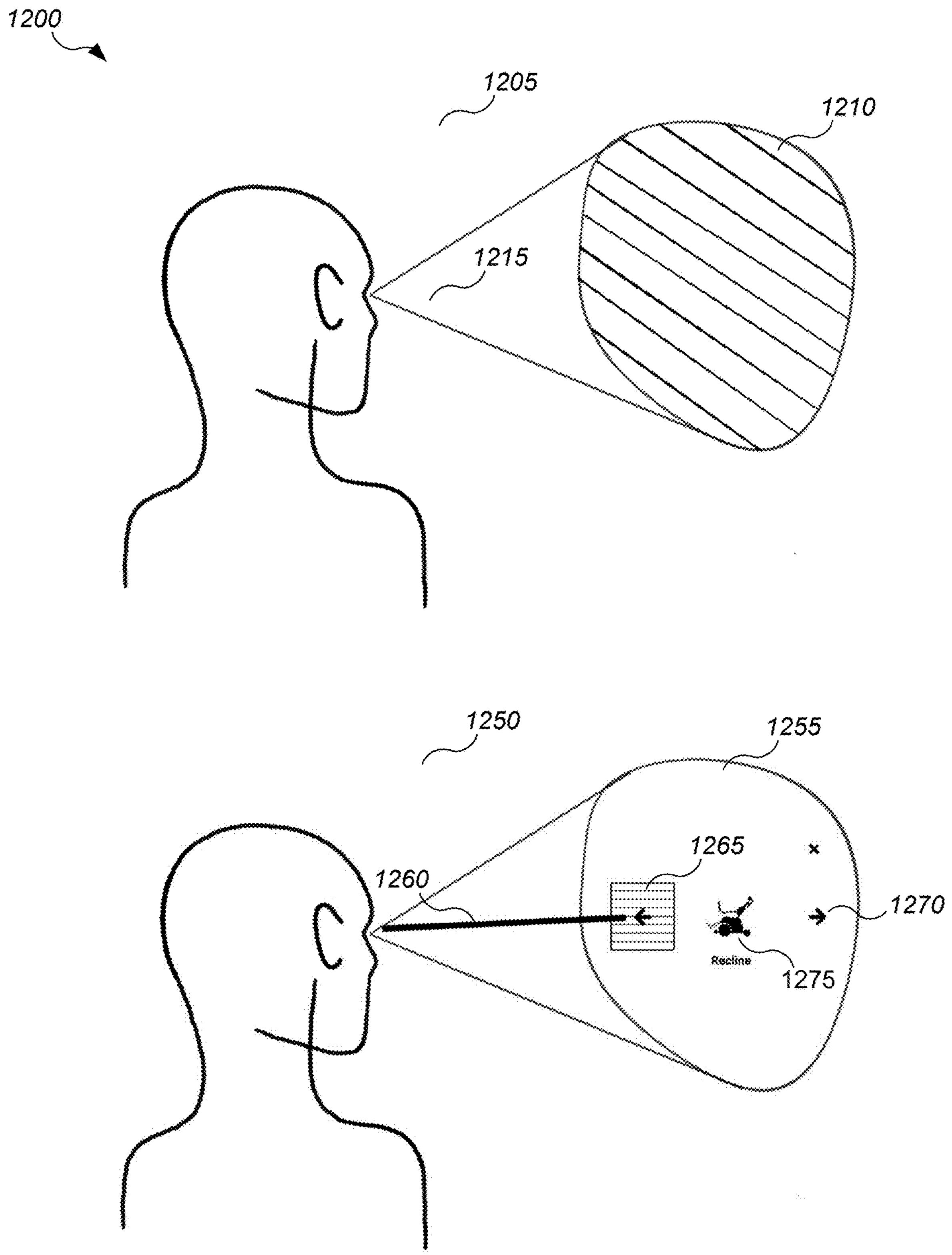
FIG. 12 are example block diagrams illustrating the concepts of attention area and gaze vector.

FIG. 12 are example block diagrams illustrating the concepts of attention area and gaze vector. These concepts are used by the EGACS application to determine whether a target is intended to be activated or not. Diagram 1205 shows a person looking out into space with a three-dimensional (conal) field of view portion 1215 that is a subset of their vision's entire field of view, in this case approximately 30° of the person's field of view. The diagram also illustrates a two dimensional (2D) planar area 1210 that represents the subset of the person's vision which we have termed the "attention area" 1210, residing within the field of view portion 1215. Attention area 1210 can be understood as the interactive surface upon which visual targets can be displayed to the user for interaction. The attention area 1210 concept is not meant to limit the ideas expressed in this EGACS to a 2D planar space, but it provides an easy reference by which to express interaction concepts, as users tend to interact with 2D-ish surfaces on a day-by-day basis. Most of our display technologies to date present approximately on a plane in front of us be that a computer monitor, a desktop, a keyboard, etc. Diagram 1250 adds additional detail to the attention area concept. Specifically, attention area (planar area) 1255 shows two interactive visual targets 1265 and 1270 as well as a gaze vector 1260 emanating from the user's eye's to visual target 1265 as it travels through the field of view portion and intersects with visual target 1265. Visual target 1265 is highlighted to demonstrate that due to the intersection with the gaze vector 1260, visual target 1265 has become active (see e.g., block 1144 in FIG. 11A. Attention area 1255 also shows non-interactive visual element 1275 which is an icon giving contextual information, in this case information about the axis/actuator that will be actuated by the activation of the nearby visual targets 1265 and 1270. Non-interactive visual element 1275 provides an example of a visual element which will not react or interact with the gaze vector 1260.

Returning to FIG. 11B, in block 1161, if the gaze vector intersects a new target, then the logic proceeds to block 1140 to change the target (FIG. 11A). In block 1140, the logic stops movement associated with the activated target (see description of block 1145 for details on how the actuator(s) associated with the activated target are determined and the commands forwarded to the actuator control interface, actuator controller(s), and actuator(s)). In block 1141, the logic deactivates the activated target, and then continues to block 1142 to perform the actuation safety check as described above.

Not shown in the diagram, logic block 1161 may include additional logic for a change activation delay similar in design to block 1118 which checks to determine whether the activation delay has passed. In the case of a powered wheelchair, there is no need for a change activation delay because the actuator controller(s) for wheelchair movement generally have built in intelligence for providing a smoothed acceleration curve for requested changes in movement direction or speed, so responsiveness of control signal is more valued than stability of control which is provided by the intelligence inside the actuator controller(s). Since intent to actuate has already been indicated by activating the active target, it is desirable to be as responsive as possible to the change to a new target. However different EGACS systems may value stability over responsiveness and therefore want to add change target activation delay logic between blocks 1161 and 1140. For example, when driving a school bus, stability may be of higher value than responsiveness, but when driving a race car, responsiveness may be of higher value than stability.

In block 1163, the logic determines whether the EGACS application is in "semi-latched mode." Semi-latched mode is an optional mode that can be turned on in the EGACS application settings that provides a smoother operation of control when the user is looking within the attention area but not on one of the visual targets. When semi-latched mode is enabled and the gaze vector intersects no target, the activated target subroutine 1150 returns to the main loop 1101. Semi-latched mode and the concept of eye gaze being "within attention area but not on a visual target" is explained in further detail with respect to FIG. 13. In block 1163, when semi-latched mode is not enabled, and if the gaze vector does not intersect any target, deactivation is started by proceeding to block 1165.

Figure 13:
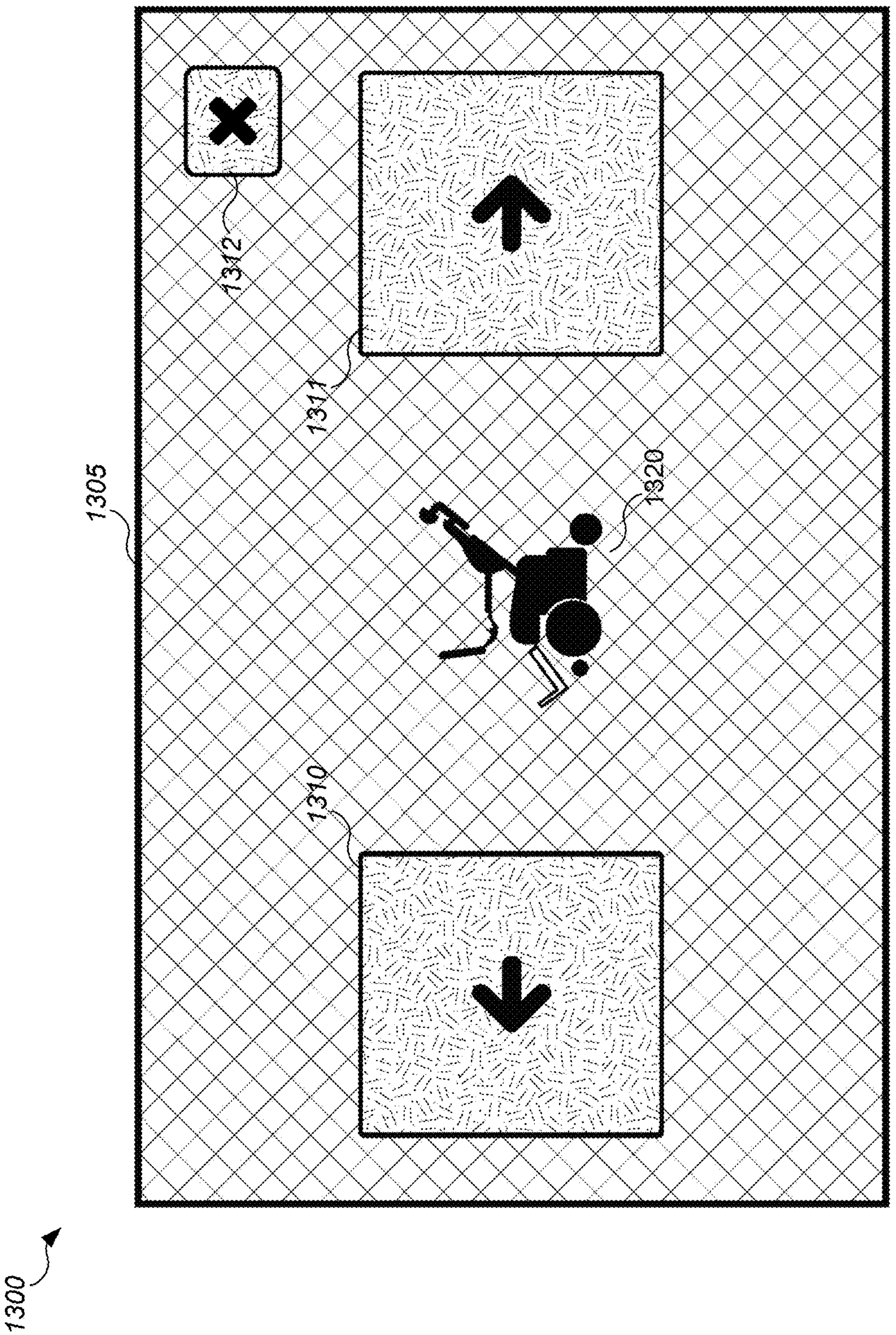
FIG. 13 is an example screen display illustrating the concepts of visual targets, visual elements, and non-interactive space.

FIG. 13 is an example screen display illustrating the concepts of visual targets, visual elements, and non-interactive space. These concepts are helpful to understand the concept of semi-latched mode in FIG. 11B, block 1163. In particular, display 1300 contains three interactive visual targets 1310, 1311, and 1312. Targets 1310 and 1311 are associated with an actuator and cause actuation to occur when activated. Target 1312 is a navigation target which is used for controlling the operation of EGACS application, in this case to exit this view and move to another aspect of the application. Visual element 1320 is a non-interactive element which shows contextual information, in this case what axis/actuator which will be actuated by the activation of the nearby visual targets 1310 and 1311. Visual Targets 1310, 1311, and 1312 show their interactivity (e.g., ability to be activated) to the user by presenting themselves differently, in this example by having a border and a different visual background/thatching. This interactivity can be visually signaled to the user in many ways depending upon the type of display being used, the desired user experience, etc. Other forms of emphasis such as color, different backgrounds, patterns, highlights, sound, and the like can be similarly incorporated. As well, the interactivity signaling can include a change in appearance as the gaze vector first intersects the area associated with a visual target. These interactions may emulate functionality provided in traditional computer interfaces such as 'mouse over animation' or 'focus animation' where one user interface element changes its appearance to highlight its 'selection' when a mouse cursor or keyboard focus occurs on the element. Attention area 1305, in this case represented as the boundaries of a display area such as a computer or tablet monitor, contains an irregular area (e.g., a non-interactive area) which is represented by the diagonal cross-hatched area. This area, which includes the area of the non-interactive visual element 1320, acts differently depending upon whether the EGACS application is or is not in semi-latched mode. When not in semi-latched mode, and when the gaze vector intersects this diagonal cross-hatched area 1305 (e.g., not intersecting a visual target), the EGACS application will begin the process of deactivating any previously activated target (see FIG. 11B, blocks 1163-1165). When in semi-latched mode, and when the gaze vector intersects attention area 1305, as long as the gaze vector doesn't exit the exterior boundary 1305 (see FIG. 11B, block 1157) the active visual target will remain in effect (see FIG. 11B, block 1163).

By using an attention area of approximately 20° (horizontal) by 15° (vertical) field of view, a person has ample area to interact with multiple visual targets as the current state of the art of gaze vector sensors today is about a 2° resolution. This provides opportunity to provide many visual targets (up to 60 using a closely packed 10×6 grid, or 15 using a 5×3 grid with large non-interactive margins of 'non-target' space). This attention area closely matches a display device of a 13" tablet at a 2.5' viewing distance and provides easy access to use peripheral vision or side glances to understand the safety context of their environment as the human field of view is approximately 200 degrees horizontal.

Semi-latched mode is in contrast to what is known as latched mode in the wheelchair alternative drive control industry. When latched mode is enabled, the last given command persists; e.g., if the user indicated 'drive forward' or 'turn right', the wheelchair executes that command until a contravening command is issued. This functionality enables users who have a very hard time maintaining expression of intent due to severe disability, such as high-level spinal cord injury or acute Cerebral Palsy which induces spasticity and/or ataxia, to achieve some level of control by 'latching' their last good command on. This is often combined with other forms of alternative controls such as Sip and Puff systems which use intake or expulsion of breath to express intent or large buttons which can be controlled with very little hand or other limb dexterity. Unfortunately, latched mode brings significant danger of operation, as it does not 'fail safe' and stop movement until a new intent can be issued to contravene the previous intent. Combining people who have extreme difficulty expressing intent due to disability with a system which will not stop movement until a new intent is expressed, results in a dangerous control system. The EGACS's improvement of providing a new semi-latched eye gaze mode brings the advantage of allowing people who have difficulty expressing intent due to disability to begin an actuation intention while giving them a quick and straightforward way of declaring "stop now!" by simply closing their eyes or moving their gaze vector outside of the attention area. In example implementations, semi-latched mode is typically optional because while a user is being newly introduced to the concept of eye gaze actuation control, semi-latched mode is generally turned off so that the wheelchair or other actuation system will quickly come to a stop when the express intent of fixating on a specific target is removed. Once the user is familiar and comfortable with eye gaze actuation, semi-latched mode can be explained and then enabled to provide them with a smoother control experience and the ability to vary their gaze around the attention area. When the attention area includes a camera and/or sensor view of their surrounding environment around the user, the EGACS gives the user the ability to review their movement and plan their motion without needing to bring the motion to a halt. For example, FIG. 15 below describes the concept of the attention area containing multiple camera views and collision sensor warnings. With semi-latched mode enabled, the user can view the collision warning 1545 and the environmental cameras forward view 1530, rear view 1515, and side views 1520/1525 to understand the environment and perform path planning without needing to bring the wheelchair or other transportation device to a stop.

Returning to FIG. 11B, block 1165, the EGACS application logic determines whether a designated deactivation delay has passed, and if so, proceeds to block 1167, otherwise proceeds back to the main loop 1101. The deactivation delay operates similarly to the activation delay described with reference to block 1118. The delay should be short enough to allow precision control but long enough to prevent unintentional deactivation from unintentional or transitory eye movement such as involuntary saccades, involuntary movements (e.g., a sneeze), or ephemeral eye travel over a target as the eyes are moving to a new fixation destination (e.g., to the pet cat outside of the attention area. Similar considerations and timing to the activation delay parameters are taken into account, although the two delays (activation and deactivation) may have separate time values.

In block 1167, the EGACS application after detecting the delay has passed, stops movement of the actuators associated with the currently active target. In block 1169, the application then deactivates the currently active target and the logic proceeds back to the main loop 1101.

FIG. 11C describes the safety intervention logic executed as a result of determining in block 1143 that it is potentially not safe to actuate a user intended action. Specifically, block 1180 is executed when the logic determines in block 1142 (the actuation safety check) a potential navigation or movement hazard such as collision with an object in the environment, exceeding a safe limit (e.g., moving seating too high which makes for a dangerous center of balance/tipping hazard, moving a seat to an extreme position that may compromise breathing assistance apparatus, driving over a high inclined surface), navigating next to environmental hazards such as near cliffs, ramps, curbs, open water, other moving vehicles, and the like. The actuation safety check (block 1142) will determine the level of concern: warn, govern, or halt (or equivalent discrete values). The level of concern is forwarded to the safety intervention system 1180 which, in block 1185, makes a choice of how to intervene. For a warn level, the logic proceeds to block 1187; for a govern level, the logic proceeds to block 1189; and for a halt level, the logic proceeds to block 1193.

In block 1187, the intervention logic shows an activation warning via visual, auditory, or vibrational feedback and then proceeds to block 1141 to activate a new target. In block 1145, the logic begins movement of the actuators associated with the active target before returning to the main loop 1101.

In block 1190, when a govern level of concern is determined, the intervention logic modifies the actuation command to modify the actuation, for example to reduce speed of actuation or to simplify the actuation (e.g., rather than move forward-left at speed, only move forward, slow the rate of turn, or turn in place). In block 1191, after governing, the logic provides visual, auditory, or vibrational feedback that governing has occurred and then proceeds to activate a new target in block 1141 as described.

In block 1193, when a halt level of concern is determined, the intervention logic provides visual, auditory, or vibrational feedback and then cancels the activation/actuation, before proceeding back to the main loop 1101.

The feedback provided in each of these choices may use color (e.g., warning yellow, stop sign red), symbols (e.g., triangle/exclamation for warning, octagonal or circle-with-cross for halt), increasing intensity of flashing/pulsing (e.g., slow pulse warning, fast pulse halt), increasing tone and volume of auditory alarms, and the like to demonstrate increasing level of safety concern. Multiple types of feedback may also be use simultaneously or in other timing or combinations.

Figure 14:
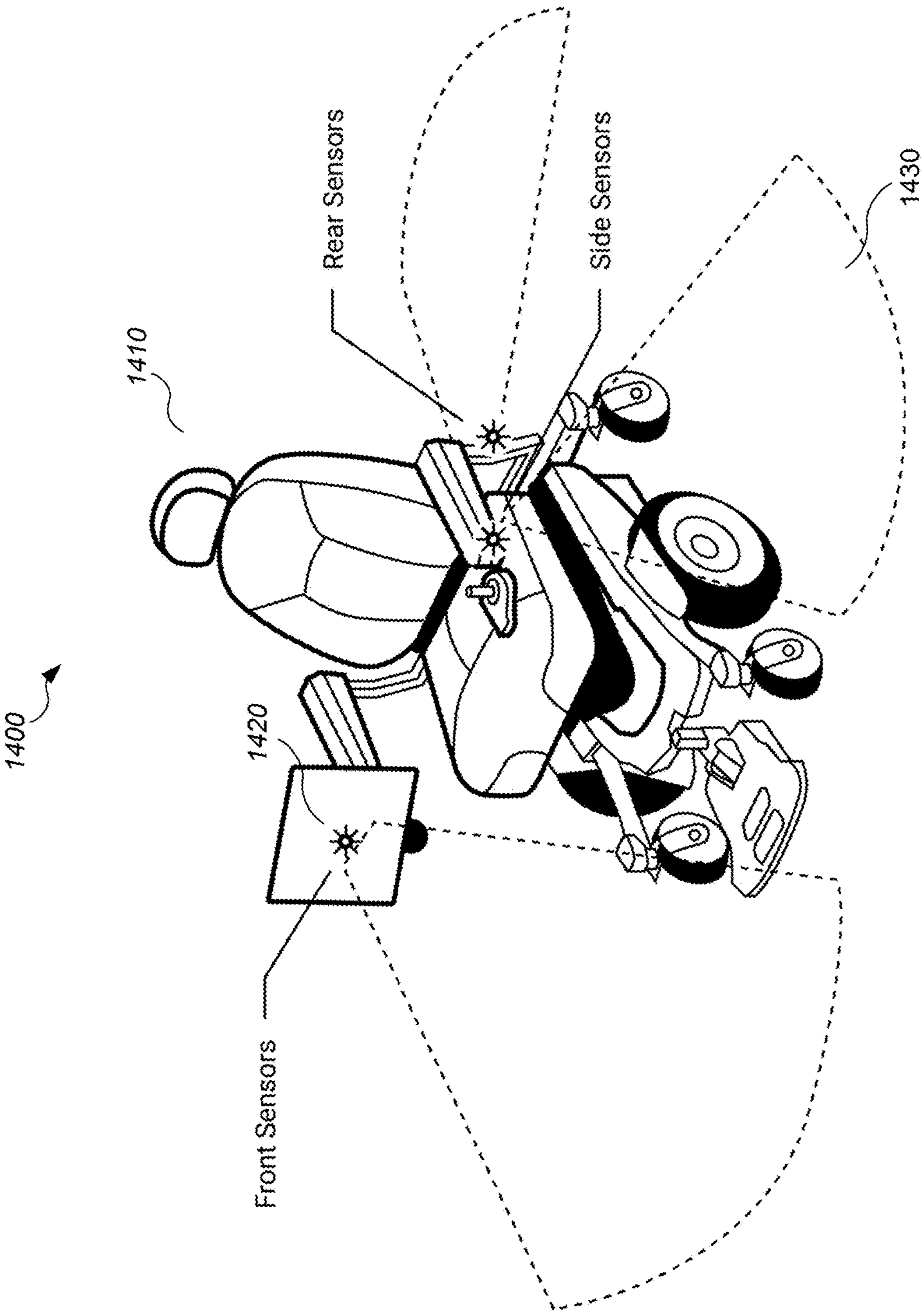
FIG. 14 is an example block diagram of a powered wheelchair with a set of integrated sensors.

FIG. 14 is an example block diagram of a powered wheelchair with a set of integrated sensors. For example, integrated sensors may be those referenced in FIG. 9 Additional Sensors 908 and/or used by the actuation safety check of block 1142 logic in FIG. 11A. These sensors may be comprised of many different types of observational (e.g., camera) or navigation (e.g., proximity, position) sensors placed in different locations around the vehicle chassis as needed to provide context and safety to actuation operation. A powered wheelchair 1410 has sensors 1420 which each have a field of view or observation 1430.

Figure 15:
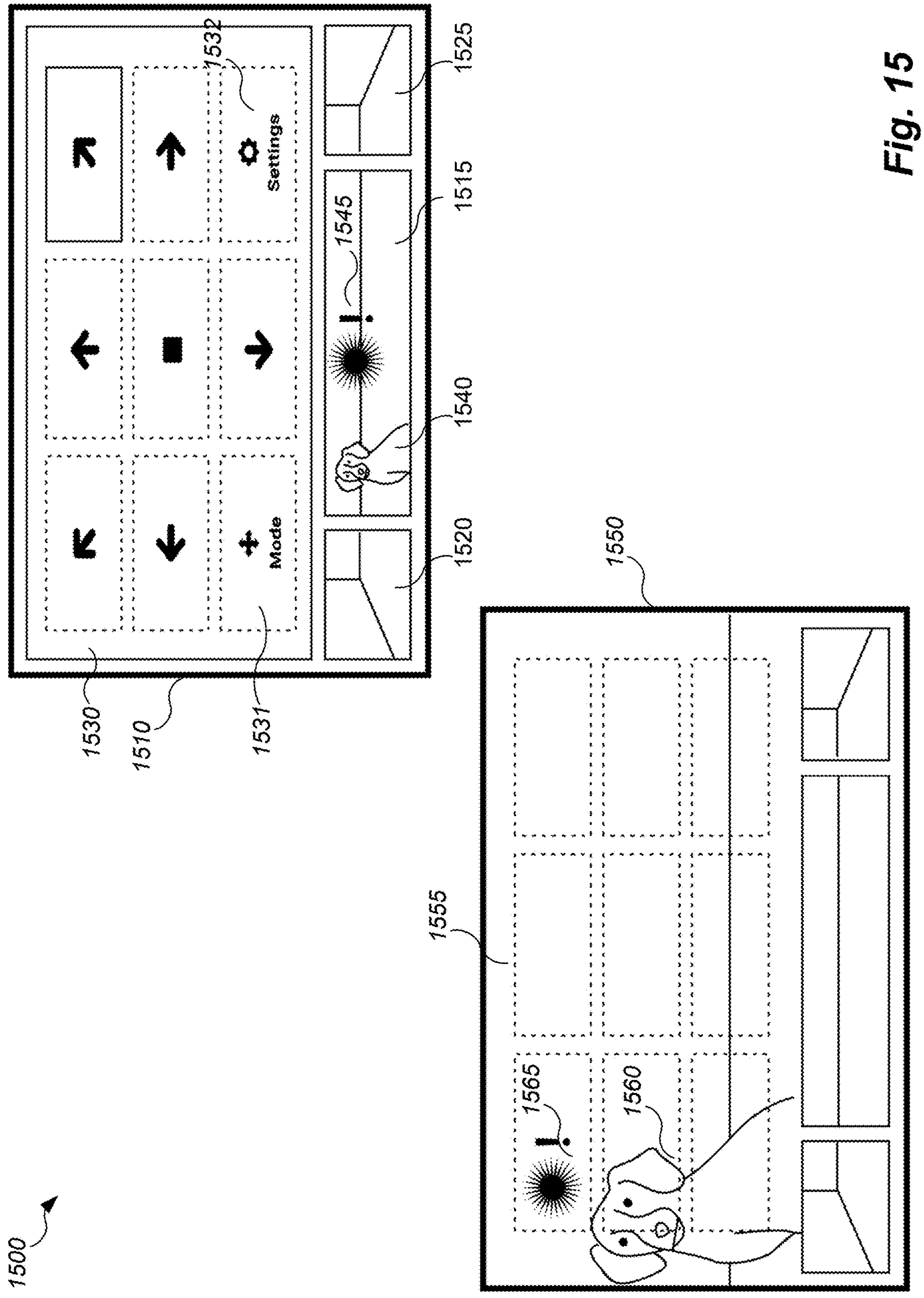
FIG. 15 shows example screen displays illustrating visual targets, sensor views, and safety warnings.

FIG. 15 shows example screen displays illustrating visual targets, sensors views, and safety warnings. Display interface 1510 contains a series of visual targets 1530 which consist of directional arrows & stop for vehicle motion control, navigation controls (e.g., settings 1531 and mode 1532), and camera views (rear 1515, left side 1520, and right side 1525). In the rear camera view, a dog 1540 behind the wheelchair presents as an obstacle that could cause a collision if the wheelchair were to be actuated backwards. This is both displayed in the rear camera sensor view 1515 and is detected by a collision sensor (see 1420 in FIG. 14). The actuation safety check of block 1142 detects the potential collision and presents a visual warning 1545 in the display. Along with this visual warning there may be additional steps the actuation safety check performed which may include auditory or vibrational warnings as well as modification of actuation commands to govern or halt potentially unsafe operation, as described with reference to FIG. 11C. Display interface 1550 contains a similar situation as display interface 1510, but in this context the dog 1560 is to the front left of the wheelchair and presents on a forward camera view along with a safety warning 1565.

From the foregoing it will be appreciated that, although specific embodiments have been described herein for purposes of illustration, various modifications may be made without deviating from the spirit and scope of the invention. For example, the methods and systems for performing eye gaze control of motorized devices discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A microcontroller implemented method in a powered device for enabling a user to control, using eye gaze interaction, one or more actuators configured to modify a position or movement of one or more components of the powered device, the powered device having an associated eye gaze sensor, the method comprising:

presenting a plurality of visual targets positioned in a designated attention area of a display or projection, the attention area comprising a subset of the field of view of the user;

receiving a stream of data points from the eye gaze sensor, the data points including detection of the presence of eyes and coordinate information regarding a visual focus of the eyes within the field of view of the user;

determining from the stream of data points an indication of the presence of eyes, and when the presence of eyes are indicated, a current eye gaze vector and an indication of whether the current eye gaze vector intersects the attention area;

when it is determined that the current eye gaze vector intersects the attention area, determining whether the eye gaze vector intersects one of the plurality of visual targets presented within the attention area;

when it is determined that the eye gaze vector intersects one of the plurality of visual targets, determining, based upon expiration of an activation delay timer, that the user intends to activate the intersected visual target or maintain activation of the intersected visual target; and causing translational or rotational movement of an actuator device associated with the intersected visual target, thereby causing positional changes or movement to the powered device;

when it is determined that the presence of eyes are not indicated or when it is determined that the current eye gaze vector does not intersect the attention area, causing cessation of movement of an actuator device associated with a most recently activated visual target;

determining if the powered device is in semi-latched mode; and when it is determined that the powered device is in semi-latched mode and when it is determined that the eye gaze vector intersects the attention area, determining if the eye gaze vector does not intersect one of the plurality of visual targets; and when it is determined that the eye gaze vector does not intersect one of the plurality of visual targets, continuing to maintain activation of the previously activated visual target; and causing continued movement of an actuator device associated with a most recently activated visual target.

2. The method of claim 1 wherein when it is determined that the presence of eyes are not indicated or when it is determined that the current eye gaze vector does not intersect the attention area, the method determines that the current eye gaze vector does not intersect the attention area.

3. The method of claim 2 wherein the causing cessation of movement causes near immediate cessation of movement of an actuator device associated with the most recently activated visual target.

4. The method of claim 1, the causing cessation of movement of an actuator device associated with a most recently activated visual target further comprising:

determining, based upon expiration of a deactivation delay timer that the user intends to deactivate the most recently activated visual target; and causing cessation of movement of an actuator device associated with the most recently activated visual target.

5. The method of claim 1, further comprising:

when it is determined that the powered device is not in semi-latched mode and when it is determined that the eye gaze vector intersects the attention area, determining if the eye gaze vector does not intersect one of the plurality of visual targets; and when it is determined that the eye gaze vector does not intersect one of the plurality of visual targets, causing cessation of movement of an actuator device associated with a most recently activated visual target.

6. A microcontroller implemented method in a powered device for enabling a user to control, using eye gaze interaction, one or more actuators configured to modify a position or movement of one or more components of the powered device, the powered device having an associated eye gaze sensor, the method comprising:

presenting a plurality of visual targets positioned in a designated attention area of a display or projection, the attention area comprising a subset of the field of view of the user;

receiving a stream of data points from the eye gaze sensor, the data points including detection of the presence of eyes and coordinate information regarding a visual focus of the eyes within the field of view of the user;

determining from the stream of data points an indication of the presence of eyes, and when the presence of eyes are indicated, a current eye gaze vector and an indication of whether the current eye gaze vector intersects the attention area;

when it is determined that the current eye gaze vector intersects the attention area, determining whether the eye gaze vector intersects one of the plurality of visual targets presented within the attention area;

when it is determined that the eye gaze vector intersects one of the plurality of visual targets, determining, based upon expiration of an activation delay timer, that the user intends to activate the intersected visual target or maintain activation of the intersected visual target; and causing translational or rotational movement of an actuator device associated with the intersected visual target, thereby causing positional changes or movement to the powered device, wherein the causing movement of an actuator device associated with the intersected target, further comprising:

causing execution of an actuation safety check system which is configured to determine whether a potential safety issue is detected; and upon receiving an indication that no potential safety issue is detected, causing movement of an actuator device associated with the intersected visual target, thereby causing positional or movement changes to the powered device; and when it is determined that the presence of eyes are not indicated or when it is determined that the current eye gaze vector does not intersect the attention area, causing cessation of movement of an actuator device associated with a most recently activated visual target.

7. The method of claim 6, further comprising:

upon receiving an indication that a potential safety issue is detected, determining a level of concern; and based upon the determined level of concern, presenting a warning to the user, modifying movement of the actuator device associated with the most recently activated visual target, or causing cessation of movement of the actuator device associated with the most recently activated visual target.

8. The method of claim 7, further comprising providing one or more of visual, auditory, and/or haptic feedback.

9. The method of claim 7 wherein modifying movement of the actuator device further comprises at least one of speed reduction, rate change, or direction control.

10. An electrically powered device comprising:

one or more actuators configured to adjust a seat or a frame according to a plurality of axes or to cause movement of the powered device;

an eye gaze sensor associated with microcontroller implemented logic to capture eye position of an occupant in order to determine occupant intent to select one or more selectable virtual user interface controls presented on the display or projection; and code logic, configured when executed by a microcontroller to:

present a plurality of visual targets positioned in a designated attention area of a display or a projection, the attention area comprising a subset of the field of view of the user;

receive a stream of data points from the eye gaze sensor, the data points including detection of the presence of eyes and coordinate information regarding a visual focus of the eyes within the field of view of the user;

determine from the stream of data points an indication of the presence of eyes, and when the presence of eyes are indicated, a current eye gaze vector and an indication of whether the current eye gaze vector intersects the attention area;

when it is determined that the current eye gaze vector intersects the attention area, determine whether the eye gaze vector intersects one of the plurality of visual targets presented within the attention area;

when it is determined that the eye gaze vector intersects one of the plurality of visual targets, determine, based upon expiration of an activation delay timer, that the user intends to activate the intersected visual target or maintain activation of the intersected visual target; and cause movement of an actuator device associated with the intersected visual target, thereby causing positional or movement changes to the powered device; and determine if the powered device is in semi-latched mode; and when it is determined that the that the powered device is in semi-latched mode and when it is determined that the eye gaze vector intersects the attention area, determine if the eye gaze vector does not intersect one of the plurality of visual targets; and when it is determined that the eye gaze vector does not intersect one of the plurality of visual targets, continuing to maintain activation of the previously activated visual target; and causing continued movement of an actuator device associated with a most recently activated visual target.

11. The device of claim 10 the code logic further configured to determine that the current eye gaze vector does not intersect the attention area or that the presence of eyes are not detected and to cause cessation of movement of the actuator device associated with a most recently activated visual target.

12. The device of claim 11 wherein the cessation of movement is near immediate.

13. The device of claim 10 wherein the code logic is further configured to first determine based upon expiration of a deactivation delay timer that the user intends to deactivate the most recently activated visual target and cause cessation of movement of an actuator device associated with the most recently activated visual target.

14. An electrically powered device comprising:

one or more actuators configured to adjust a seat or a frame according to a plurality of axes or to cause movement of the powered device;

an eye gaze sensor associated with microcontroller implemented logic to capture eye position of an occupant in order to determine occupant intent to select one or more selectable virtual user interface controls presented on the display or projection; and code logic, configured when executed by a microcontroller to:

present a plurality of visual targets positioned in a designated attention area of a display or a projection, the attention area comprising a subset of the field of view of the user;

receive a stream of data points from the eye gaze sensor, the data points including detection of the presence of eyes and coordinate information regarding a visual focus of the eyes within the field of view of the user;

determine from the stream of data points an indication of the presence of eyes, and when the presence of eyes are indicated, a current eye gaze vector and an indication of whether the current eye gaze vector intersects the attention area;

when it is determined that the current eye gaze vector intersects the attention area, determine whether the eye gaze vector intersects one of the plurality of visual targets presented within the attention area;

when it is determined that the eye gaze vector intersects one of the plurality of visual targets, determine, based upon expiration of an activation delay timer, that the user intends to activate the intersected visual target or maintain activation of the intersected visual target; and cause movement of an actuator device associated with the intersected visual target, thereby causing positional or movement changes to the powered device; and perform an actuation safety check and receive indication that no potential safety issue is detected prior to causing movement of an actuator device associated with the intersected visual target.

15. The device of claim 14 wherein the actuation safety check determines potential safety issues from input and/or sensors associated with range of motion, movement limits, orientation considerations, collision detection, and/or environmental considerations.

16. The device of claim 10 wherein the eye gaze sensor is a camera, a head mounted display, virtual reality glasses, or augmented reality glasses.

17. The device of claim 10, further comprising:

logging and telemetry logic configured to report one or more of system diagnostics, usage, positioning activations, and pressure monitoring data to a data repository.

18. A computer-readable memory medium containing instructions, when executed on a microcontroller in a powered device, for enabling a user to control, using eye gaze interaction, one or more actuators configured to modify a position or movement of one or more components of a powered device, the powered device having an associated eye gaze sensor, by performing a method comprising:

presenting a plurality of visual targets positioned in a designated attention area of a display or projection, the attention area comprising a subset of the field of view of the user;

receiving a stream of data points from the eye gaze sensor, the data points including detection of the presence of eyes and coordinate information regarding a visual focus of the eyes within the field of view of the user;

determining from the stream of data points an indication of the presence of eyes, and when the presence of eyes are indicated, a current eye gaze vector and an indication of whether the current eye gaze vector intersects the attention area;

when it is determined that the current eye gaze vector intersects the attention area, determining whether the eye gaze vector intersects one of the plurality of visual targets presented within the attention area;

when it is determined that the eye gaze vector intersects one of the plurality of visual targets, determining, based upon expiration of an activation delay timer, that the user intends to activate the intersected visual target or maintain activation of the intersected visual target; and causing translational or rotational movement of an actuator device associated with the intersected visual target, thereby causing positional changes or movement to the powered device; and determining if the powered device is in semi-latched mode; and when it is determined that the powered device is in semi-latched mode and when it is determined that the eye gaze vector intersects the attention area, determining if the eye gaze vector does not intersect one of the plurality of visual targets; and when it is determined that the eye gaze vector does not intersect one of the plurality of visual targets, continuing to maintain activation of the previously activated visual target; and causing continued movement of an actuator device associated with a most recently activated visual target.

19. The device of claim 18 the code logic further configured to determine that the current eye gaze vector does not intersect the attention area or that the presence of eyes are not detected and cause cessation of movement of the actuator device associated with a most recently activated visual target.

20. The device of claim 19 wherein the cessation of movement is near immediate.

21. The method of claim 6 wherein the causing cessation of movement causes near immediate cessation of movement of an actuator device associated with the most recently activated visual target.

22. The method of claim 21, the causing cessation of movement of an actuator device associated with a most recently activated visual target further comprising:

determining, based upon expiration of a deactivation delay timer that the user intends to deactivate the most recently activated visual target; and causing cessation of movement of an actuator device associated with a the most recently activated visual target.

23. The device of claim 14, the code logic further configured to:

upon receiving an indication that a potential safety issue is detected, determine a level of concern; and based upon the determined level of concern, present a warning to the user, modify movement of the actuator device associated with the most recently activated visual target, or cause cessation of movement of the actuator device associated with the most recently activated visual target.

24. The device of claim 23, the code logic further configured to provide one or more of visual, auditory, and/or haptic feedback.

25. The device of claim 23 wherein the modifying movement of the actuator device further comprises at least one of speed reduction, rate change, or direction control.

26. The device of claim 14 the code logic further configured to cause cessation of movement by causing near immediate cessation of movement of an actuator device associated with the most recently activated visual target.

27. The device of claim 26, the code logic further configured to cause cessation of movement of an actuator device associated with a most recently activated visual target by:

determining, based upon expiration of a deactivation delay timer that the user intends to deactivate the most recently activated visual target; and causing cessation of movement of an actuator device associated with a the most recently activated visual target.

28. A computer-readable memory medium containing instructions, when executed on a microcontroller in a powered device, for enabling a user to control, using eye gaze interaction, one or more actuators configured to modify a position or movement of one or more components of a powered device, the powered device having an associated eye gaze sensor, by performing a method comprising:

presenting a plurality of visual targets positioned in a designated attention area of a display or projection, the attention area comprising a subset of the field of view of the user;

receiving a stream of data points from the eye gaze sensor, the data points including detection of the presence of eyes and coordinate information regarding a visual focus of the eyes within the field of view of the user;

determining from the stream of data points an indication of the presence of eyes, and when the presence of eyes are indicated, a current eye gaze vector and an indication of whether the current eye gaze vector intersects the attention area;

when it is determined that the current eye gaze vector intersects the attention area, determining whether the eye gaze vector intersects one of the plurality of visual targets presented within the attention area;

when it is determined that the eye gaze vector intersects one of the plurality of visual targets, determining, based upon expiration of an activation delay timer, that the user intends to activate the intersected visual target or maintain activation of the intersected visual target; and causing translational or rotational movement of an actuator device associated with the intersected visual target, thereby causing positional changes or movement to the powered device; and performing an actuation safety check and receive indication that no potential safety issue is detected prior to cause causing movement of an actuator device associated with the intersected visual target.

29. The computer readable memory medium of claim 28, the method further comprising:

upon receiving an indication that a potential safety issue is detected, determining a level of concern; and based upon the determined level of concern, presenting a warning to the user, modifying movement of the actuator device associated with the most recently activated visual target, or causing cessation of movement of the actuator device associated with the most recently activated visual target.

30. The computer readable memory medium of claim 29, the warning further comprising providing one or more of visual, auditory, and/or haptic feedback.

31. The computer readable memory medium of claim 29 wherein modifying movement of the actuator device further comprises at least one of speed reduction, rate change, or direction control.

32. The computer readable memory medium of claim 28 wherein the causing cessation of movement causes near immediate cessation of movement of an actuator device associated with the most recently activated visual target.

33. The computer readable memory medium of claim 32, the causing cessation of movement of an actuator device associated with a most recently activated visual target further comprising:

- determining, based upon expiration of a deactivation delay timer that the user intends to deactivate the most recently activated visual target; and
- causing cessation of movement of an actuator device associated with a the most recently activated visual target.

* * * * *